(12) United States Patent
Graham

(10) Patent No.: US 8,374,203 B2
(45) Date of Patent: Feb. 12, 2013

(54) APPARATUS AND METHOD TO ACHIEVE A CONSTANT SAMPLE RATE FOR MULTIPLEXED SIGNALS WITH FRAME BOUNDARIES

(75) Inventor: Harry L. Graham, San Jose, CA (US)

(73) Assignee: Winnov, L.P., Santa Clara, CA (US)

( * ) Notice: Subject to any disclaimer, the term of this patent is extended or adjusted under 35 U.S.C. 154(b) by 1367 days.

(21) Appl. No.: 11/479,775

(22) Filed: Jun. 29, 2006

(65) Prior Publication Data

US 2007/0053380 A1    Mar. 8, 2007

Related U.S. Application Data

(60) Provisional application No. 60/695,624, filed on Jun. 29, 2005.

(51) Int. Cl.
*H04J 3/04* (2006.01)
(52) U.S. Cl. ............... 370/535; 370/544; 370/545
(58) Field of Classification Search ........... 370/535–545
See application file for complete search history.

(56) References Cited

U.S. PATENT DOCUMENTS

| | | | | |
|---|---|---|---|---|
| 5,268,900 A | * | 12/1993 | Hluchyj et al. | 370/429 |
| 5,636,149 A | * | 6/1997 | Funck et al. | 708/271 |
| 7,007,101 B1 | * | 2/2006 | Schwaderer | 709/238 |
| 7,330,900 B2 | * | 2/2008 | Burger et al. | 709/231 |
| 2005/0125701 A1 | * | 6/2005 | Hensbergen et al. | 713/320 |

OTHER PUBLICATIONS

Society of Motion Picture and Television Engineers, "SMPTE 170M-1999, SMPTE Standard for Television—Composite Video Signal—NTSC for Studio Applications", Approved Apr. 21, 1999, copyright 1999, The Society of Motion Picture and Television Engineers, 595 W. Hartsdale Ave., White Plains, NY 10607.

Society of Motion Picture and Television Engineers, "ANSI/SMPTE 125-1995, SMPTE Standard for Television—Component Video Signal 4:2:2—Bit-Parallel Digital Interface", Approved Sep. 12, 1995, copyright 1995, The Society of Motion Picture and Television Engineers, 595 W. Hartsdale Ave., White Plains, NY 10607.

Microsoft Corporation, "AVStream_Reference", from Windows 2003 DDK (Driver Development Kit), Streaming Devices, Video and Audio, AVStream Minidrivers, built on Jan. 16, 2003, Microsoft Corporation, Redmond, WA.

Microsoft Corporation, "AVStream_DesignGuide", from Windows 2003 DDK (Driver Development Kit), Streaming Devices, Video and Audio, AVStream Minidrivers, built on Jan. 16, 2003, Microsoft Corporation, Redmond, WA.

* cited by examiner

*Primary Examiner* — Kibrom T Hailu
*Assistant Examiner* — Benjamin Lamont
(74) *Attorney, Agent, or Firm* — West & Associates, APC; Stuart J. West; Theodore A. Marsh

(57) ABSTRACT

Given a hardware platform capable of capturing framed data in a multiplexed fashion from multiple sources, a method and apparatus are shown for providing a constant frame rate for each logical stream.

24 Claims, 19 Drawing Sheets

APPARATUS AND METHOD TO ACHIEVE A CONSTANT SAMPLE RATE FOR MULTIPLEXED SIGNALS WITH FRAME BOUNDARIES

PRIORITY

This application is related to and claims priority under 35 U.S.C. 119(e) to U.S. Provisional Patent Application No. 60/695,624 filed on Jun. 29, 2005 entitled "Apparatus and Method to achieve a constant sample rate for multiplexed signals with frame boundaries" by H. Graham the complete content of which is hereby incorporated by reference.

BACKGROUND

1. Field of the Invention

The present invention is related to an apparatus and method to achieve a constant sample rate for multiplexed signals with frame boundaries.

2. Related Art

In an example "Conventional" approach, a single digitizer (or other) resource can be shared among multiple video streams by placing an analog multiplexer between the analog video sources and the digitizer. The analog multiplexer is then switched (at the appropriate time), the digitizer is synchronized to the new video source, and a sample (field or frame) is grabbed. This sample is presented as the next sample for a logical stream associated with the specific video source. After each frame is grabbed, the sequence is repeated for the next (or in some specific cases, the same) source.

If there is a need to achieve a higher frame rate for a specific source, or sources, the order of switching, as specified by the index of each source, can be modified to provide a higher weighting to such source or sources.

A significant limitation of the "Conventional" approach is that it is not possible to specify a specific, pre-determined, frame rate for each logical stream (source). In some cases, such as video encoding, it is very important to allow the application to specify the frame rate, in order to get the best quality, predictable, results.

BRIEF DESCRIPTION OF THE DRAWINGS

FIG. 2 is a table of arithmetic examples.

DETAILED DESCRIPTION

Figure 1:
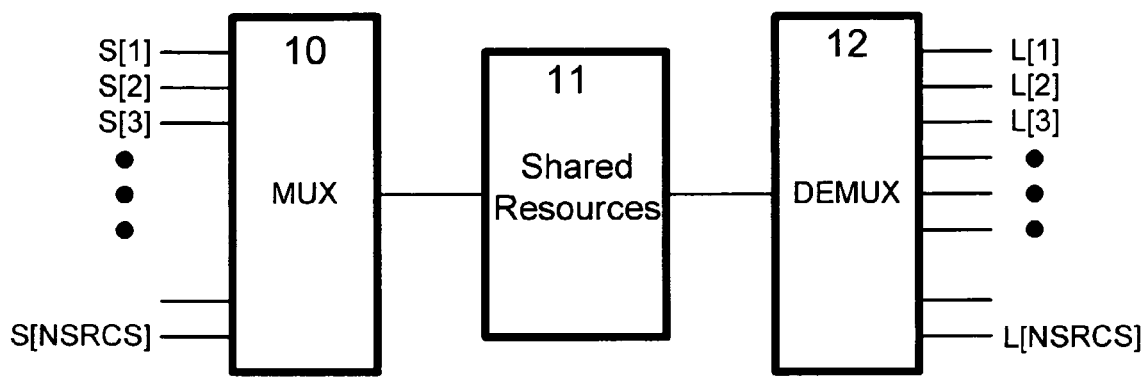
FIG. 1 is a block diagram of the system.

In FIG. 1, a multiplexer 10 routes one of a plurality of input sources to shared resources 11. Each source can be an analog video signal or any other known and/or convenient form of signal comprising a stream of distinct frames. The frames can be defined by frame boundaries. Each source frame can correspond, but does not necessarily correspond, to a specific representation of a visual image. In some embodiments a source frame corresponds to a single frame of a NTSC video signal. Information in a frame, denoted by frame boundaries, can also comprise arbitrarily framed data.

The shared resources 11 process input from the multiplexer 10 and supply frames to the logical streams shown as the output of a demultiplexer DEMUX 12. There can be a 1-to-1 correspondence between input sources and logical streams, or any other convenient correspondence between input sources and logical streams. Let NSRCS represents the number of input sources. Information obtained from each of the NSRCS input streams S[i] can be routed specifically to a corresponding logical stream L[i], for i=1, . . . , NSRCS. The number of sources, NSRCS, can be one or more. There can be more complicated relationships between input sources and logical streams; the 1-to-1 relationship is presented here by way of non-limiting example.

By way of non-limiting example, the shared resources 11 can comprise a video decoder and/or data buffer and/or a host memory controller. In some embodiments these elements can be used to process input sources comprising NTSC and/or other standards-based analog video input signals or any other signal that is dissociable by frames, for the purpose of supplying the logical streams L[i] with information derived from the input sources S[i]. The input source signals and the logical streams each can be organized as framed information, that is, information grouped into a sequence of frames.

Each of the logical streams L[i] can have an associated specified frame rate RL[i]. Each RL[i] can be specified by a person and/or any known and/or convenient process, such as a software application. That is, each specified RL[i] frame rate can be arbitrary, and each specified RL[i] can be user-defined.

Each of the input source streams S[i] can have an associated nominal frame rate RSn[i]. The value of RSn[i] can be inherent to the corresponding input source signal. By way of non-limiting example, for a standard NTSC video input signal an inherent frame rate can be 30×(1000/1001) frames per second, which is often approximated as 29.97 Hz. As a matter of convenience a frame rate can be represented by a corresponding nominal frame period, that is, the time between successive individual frames, TSn[i]=1/RSn[i]. It can be appreciated that the period between successive individual frames can be equal to or larger than the amount of time actually used and/or required in order to communicate the information corresponding to an individual frame. By way of non-limiting example, in some embodiments the data representing an individual NTSC frame can be communicated in significantly less time than the nominal frame period of approx. 33 milliseconds, even while a stream of such frames are regularly arranged approx. 33 msec apart in time.

The source input multiplexer MUX 10 can select source inputs responsive to a source sequence list, in order to supply each of the logical streams L[i] with information derived from a corresponding input source S[i]

A source sequence list can provide an ordered sequence corresponding to source input multiplexer 10 selections. The multiplexer MUX 10 can select input streams responsive to a source sequence list. Shared resources 11 and/or other means can support selecting and/or processing input stream data organized as frames and providing corresponding framed data to logical streams. In some embodiments this support of framed data can result in the duration of a particular source input multiplexer selection of one or more nominal frame periods for the corresponding selected source input stream. By way of non-limiting example, in some embodiments a selected input to multiplexer 10 can comprise an analog NTSC standard video input signal, in which case a minimum duration for the multiplexer input selection of one or more nominal frame periods ([1/(30*1000/1001)] seconds, approx. 33 msec) can be required to wholly capture a single frame.

A source sequence list can be notated as an ordered array of selection operations, SO[j] for j=1, ..., SSL, where SSL is the integer length of the ordered list and j is the ordering index. The ordering index j can indicate sequential order of selection of input streams along a timeline and/or any other convenient axis. The value of an SO[j] array element can indicate and correspond to the selection of a specific input to the multiplexer MUX 10 within an order indicated by the index j. A SO[j] array element value can also indicate and correspond to enabling or disabling the processing of input at the time order indicated by index j. In general the absolute and/or relative time at which SO[j] invokes a specific input does not vary precisely with j in a linear or affine manner, but it can in some circumstances. In general, j specifies the order of source switching that occurs along a timeline, but need not identify the precise location of switching events upon a timeline.

SSL can be a finite positive integer, corresponding to a finite length list.

Herein described are systems and methods for developing one or more source sequence lists. A source sequence list developed as described herein can provide support for one or more of several advantageous properties for system embodiments described herein.

In some embodiments a source sequence list so developed can support the advantageous system property of providing framed data to each logical stream L[i] at an associated specified frame rate RL[i], from a corresponding input source of framed data S[i].

In some embodiments a source sequence list so developed can support the advantageous system property of maintaining a substantially constant input data frame rate to each logical stream L[i], from a corresponding input source of framed data S[i].

In some embodiments a source sequence list so developed can support the advantageous system property of minimizing sampling phase noise, also known as and/or jitter, attendant to (frame) sampling of an input source stream S[i]; a logical stream L[i] being provided with selected, that is, sampled, frames of data from the corresponding input source stream S[i].

In some embodiments a source sequence list so developed can support the advantageous system property of providing framed data to each logical stream L[i] at a frame rate that can be scaled by a system efficiency parameter "Efficiency" and can be proportional to an associated specified frame rate RL[i], from a corresponding input source of framed data S[i].

In some embodiments source sequence lists can be developed that can support the advantageous system property of dynamic adjustment responsive to changes in system configuration and/or responsive to one or more system performance measures, in order to support advantageous system properties described herein and/or any other known and/or convenient system properties.

A first case of operation, Case 1, can occur under the circumstances of there being only one input source stream S[1] employed in the embodiments herein. This is a degenerate case in which only one source is selected and/or used; the source sequence list is trivial.

A second case of operation, Case 2, can apply when there are quantity NSRCS input source streams S[i], i=1, ..., NSRCS, and it is anticipated that each of the logical streams L[i] can be supplied with framed data at an associated specified frame rate RL[i], from a corresponding input source of framed data S[i]. That is, the aggregate specified frame rate can be achieved.

A third case of operation, Case 3, can apply when there are quantity NSRCS input source streams S[i], i=1, ..., NSRCS, and it is anticipated that each of the logical streams L[i] can not be supplied with framed data at an associated specified frame rate RL[i], from a corresponding input source of framed data S[i]. That is, the aggregate specified frame rate can not be achieved.

Figure 8:
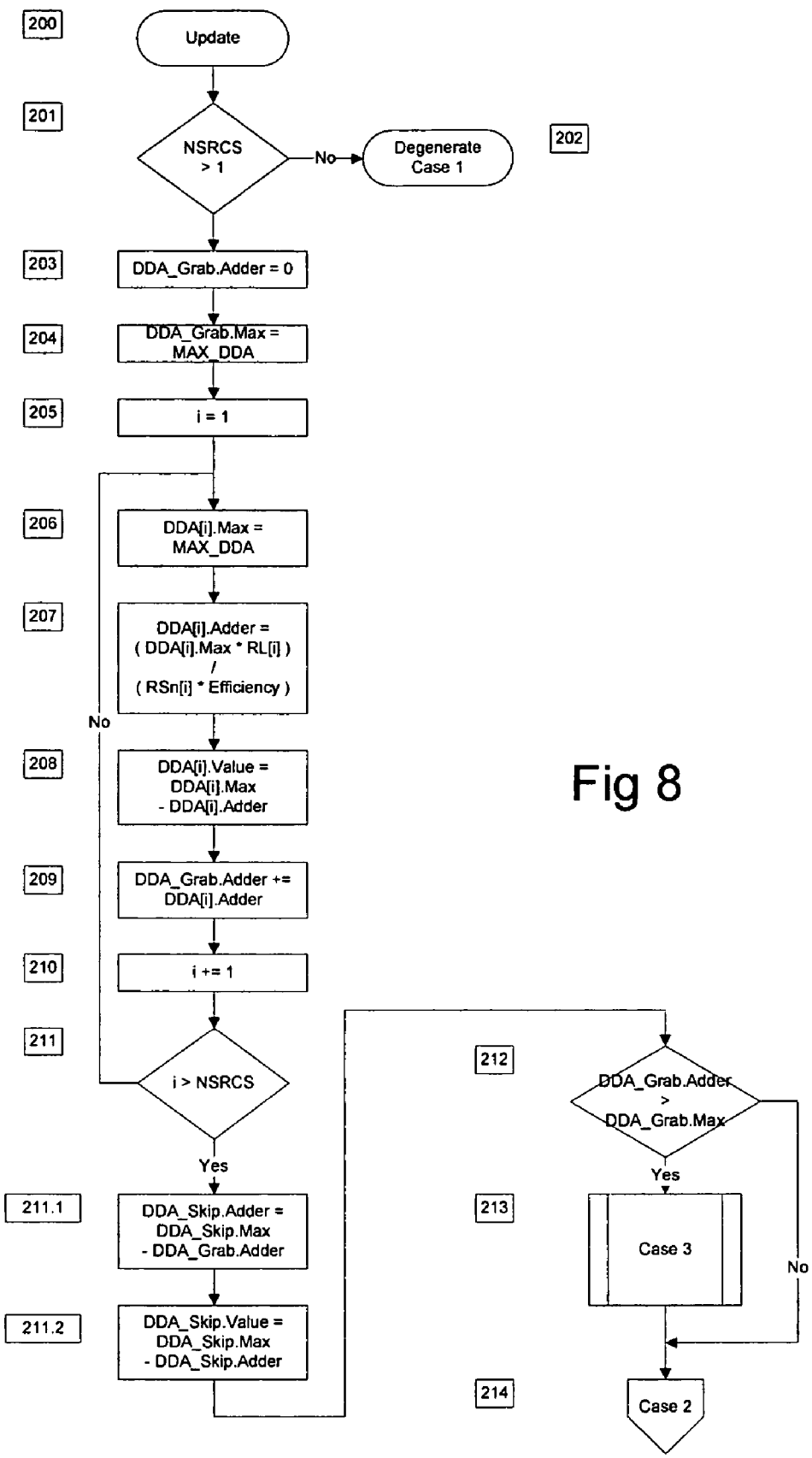
FIG. 8 illustrates (Update) Update

A phase-accumulation technique can be employed to differentiate between Case 2 and Case 3 conditions. An embodiment of this capability is shown in FIG. 8 "Update".

Individual increment values DDA[i].Adder for each of the input sources can be calculated as:

$$DDA[i].\text{Adder}=\text{MAX\_DDA}*RL[i]/(RSn[i]*\text{Efficiency}), \text{ for each } i=1,\ldots,\text{NSRCS} \quad \text{Equation 1}$$

MAX_DDA corresponds to an arbitrary rollover value for phase-accumulators herein employed, that is, a modulus. RL[i] and RSn[i] are as defined above: the specified frame rate for a logical stream and the nominal frame rate for an input source stream, respectively.

The Efficiency term derates the effective available input rate RSn[i] of each input stream by an estimate of system efficiency. That is, a completely efficient system could make 100% of the frames of data within one or more input streams available, corresponding to an Efficiency value of 1.0. Various factors can reduce the efficiency of the system, resulting in an efficiency of less than 1.0. By way of non-limiting example in some embodiments switching between NTSC analog video sources can necessitate performing and completing a resynchronization process, prior to utilizing a selected input; the duration of the resynchronization process can be a significant fraction of a nominal NTSC video frame period. If switching between sources result in the system on average being able to capture precisely 9 input video frames during a time interval equivalent to 10 input video frame periods, the efficiency Efficiency can be 90%, that is, 0.9.

It can be appreciated that in some embodiments Efficiency can exceed 100%, that is, Efficiency can be greater than 1.0.

Standard NTSC video frames can consist of two interlaced fields per video frame. Each field can be delivered sequentially in the time domain and each field can represent alternate display lines in a graphic image. That is, a video frame can comprise two fields, and each field can differ from the other in (transmission) time and/or spatial (corresponding to location on a display) information. In some embodiments it can be advantageous to utilize video fields instead of video frames within one or more information streams, and/or to utilize a combination of video fields and video frames within one or more information streams. It can be appreciated that a frame of data can comprise one or more video fields. It can also be appreciated that a frame of data can comprise one or more video frames. In short, a video frame can in some cases correspond to a frame of data as utilized herein. However, a frame of data, that is, a data frame, can in some embodiments comprise any known and/or convenient grouping of data.

In some embodiments, a logical stream can be restricted to use either the first or the second of the two fields comprising an input stream video frame, in order to preserve spatial information.

In some embodiments a logical stream can be substantially indifferent to which of the two fields comprising an input stream video frame is utilized. That is, in some embodiments a spatial shift process or processes can be applied to either or both of the two fields in order to minimize spatial and/or other differences between the fields, and the temporal difference between the two fields can be ignored.

In some embodiments input stream video fields can correspond to data frames while logical streams utilize corresponding data frames that correspond to video frame timing. That is, RL[i] can be a video frame rate while corresponding input stream video fields can have a nominal data frame rate RSn[i] at a video field rate. The RSn[i], corresponding to video field timing, can be essentially twice the rate of RL[i] that corresponds to video frame timing. Clearly in some embodiments this can result in an Efficiency approaching 2.0.

An aggregate increment value DDA_Grab.Adder can be calculated as the sum of all DDA[i].Adder terms. If DDA_Grab.Adder is greater than DDA_MAX, Case 3 applies. If DDA_Grab.Adder is less than or equal to DDA_MAX, Case 2 applies.

Figure 9:
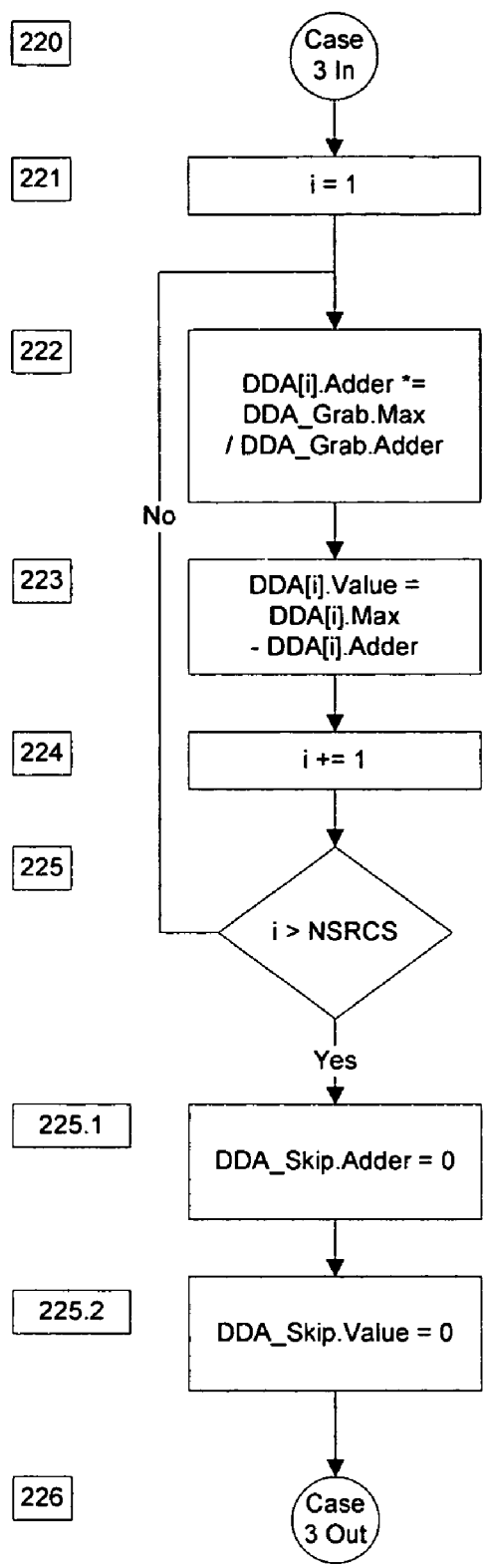
FIG. 9 illustrates (Update) Case 3

Under the conditions of Case 3, the DDA[i].Adder values can be proportionally scaled down so that their recomputed aggregate does not exceed the rollover value DDA_MAX. An embodiment of this capability is shown in FIG. 9 "Case 3".

Each DDA[i].Adder can be scaled by the factor (DDA_MAX/DDA_Grab.Adder). The demand for input resources for each logical stream L[i], represented by each DDA[i].Adder can be equitably derated across all of the logical streams by this scaling procedure. Under the conditions of Case 3, after scaling each DDA[i].Adder as described, further calculations can be as in Case 2.

Under the conditions of Case 2, a DDA_Skip.Adder value can be calculated as:

$$DDA\_Skip.Adder = MAX\_DDA - \sum_{i=1}^{NSRCS} DDA[i].Adder \qquad \text{Equation 2}$$

DDA_Skip.Adder corresponds to the input capacity remaining after the demand for every logical stream L[i] is taken into account.

Figure 2:
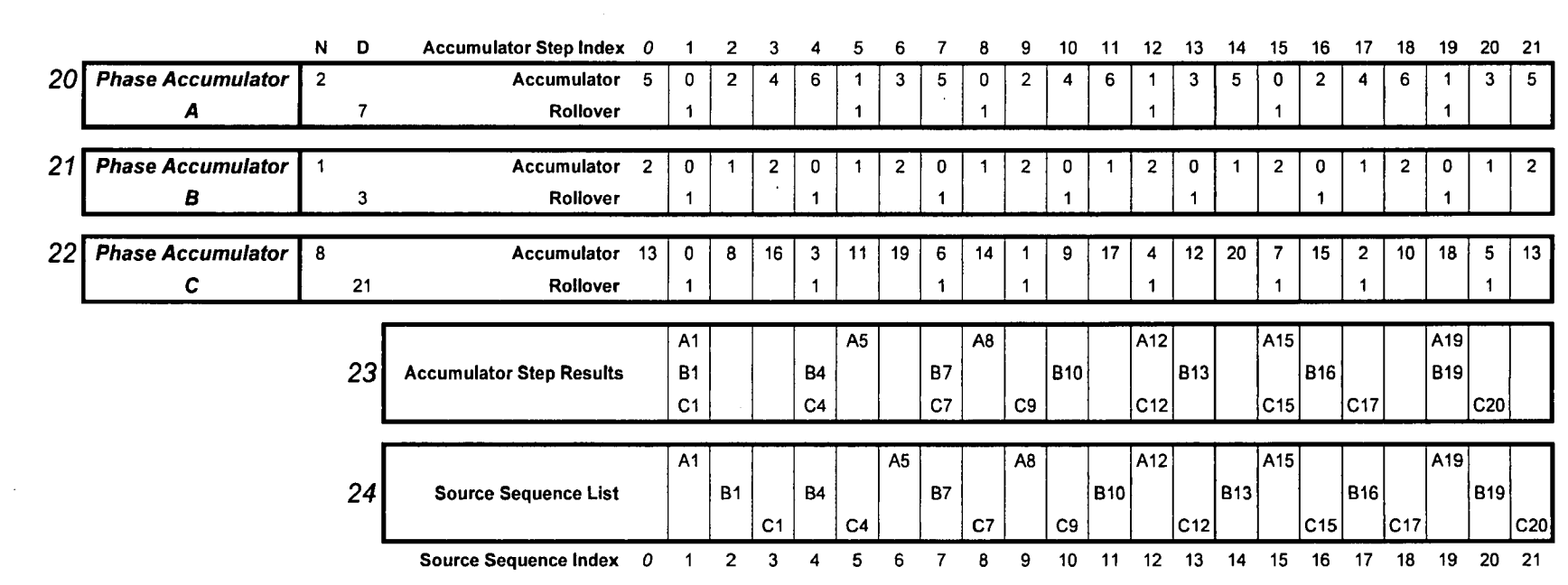

FIG. 2 provides an arithmetic example of some principles of operation corresponding to embodiments herein described. Each of the Phase Accumulators A 20, B 21, and C 22 can correspond to the demands of an associated logical stream, or an associated "skip" process. For example Phase Accumulator A 20 can correspond to a logical stream L[1], B 21 can correspond to L[2], and C 22 can correspond to L[3]. Alternatively A 20 and B 21 can be as just described while C 22 corresponds to a "skip" process; the skip process can correspond to the input capacity remaining after the demands for the logical streams L[1] and L[2] are taken into account. The phase accumulator calculations in FIG. 2 can be insensitive to the type of associated demand, that is, whether demand corresponds to a logical stream or a skip process.

The entries for each Phase Accumulator show the results of counting by N modulo D. For each Phase Accumulator, the fraction N/D corresponds to the fraction of input stream supply demanded by the corresponding logical stream or skip process. In some embodiments each of a plurality of phase accumulators can use the same D. In the FIG. 2 example, N and D can be chosen for convenience to be small integers. The aggregate demand of the system example shown can equal 1. That is, 2/7+1/3+8/21=1.

For each of the Phase Accumulators A 20 B 21 C 22, the top line of entries shows counting by the corresponding N modulo the corresponding D, starting from an initial value of D-N. These entries can correspond to the contents of a phase accumulator memory. The next line for each Phase Accumulator shows an entry of "1" at each phase accumulator step that generates a rollover. A rollover takes place in the event that the sum of a phase accumulator memory and the associated increment N is greater than or equal to D. In FIG. 2, phase accumulator steps are indexed in common for all of the phase accumulators, with the index 0 corresponding to initialization that precedes the first step. Accumulator Step indices are shown above the Phase Accumulator entries.

The results of phase accumulator steps can be recorded as shown in Accumulator Step Results 23 of FIG. 2. An entry can be made for each rollover at each indexed Accumulator Step, for each Phase Accumulator, indicating the corresponding Phase Accumulator. For convenience here, each of these entries also includes the associated Accumulator Step Index. These entries can be put into an ordered list, the Source Sequence List shown in element 24 of FIG. 2. Accumulator Step Results 23 are ordered first by an arbitrary order for the Phase Accumulators, in this example, A then B then C. Accumulator Step Results 23 are ordered second by Accumulator Step Index.

The Source Sequence List 24 is shown, populated with entries from Accumulator Step Results 23. The Source Sequence List is indexed by Source Sequence Index. Source Sequence Index corresponds to successive input "supply" opportunities. The Source Sequence List specifies the order in which successive input frames can be allocated to logical streams and/or skip processes. In this example the Source Sequence List entries each include both identification of the corresponding Phase Accumulator, and the Accumulator Step Index corresponding to generation of the entry. The Accumulator Step Index need not be present in the Source Sequence List, in some embodiments.

It can be appreciated that by these methods, in this example, each specified demand can be satisfied to high precision during one instance of a Source Sequence List. A logical stream (or skip process) associated with Phase Accumulator A 20 can be allocated precisely 6 of 21 of supply opportunities, equivalent to the corresponding fraction specified as N over D, 3/7. A logical stream (or skip process) associated with Phase Accumulator B 21 can be allocated precisely 7 of 21 supply opportunities, equivalent to the corresponding specified N over D, 1/3. A logical stream (or skip process) associated with Phase Accumulator C 22 can be allocated precisely 8 of 21 supply opportunities, as specified by the corresponding N over D, 8/21.

In the example of FIG. 2, the Source Sequence List entries can repeat in groups of 21, in the event that the processes continue. A Source Sequence List can have a finite length known as the Source Sequence Length, which in this case can be conveniently chosen as 21. In some embodiments, Source Sequence Length and initial conditions for the Phase Accumulator memories can be developed and/or chosen in other known and/or convenient manners.

Figure 3A:
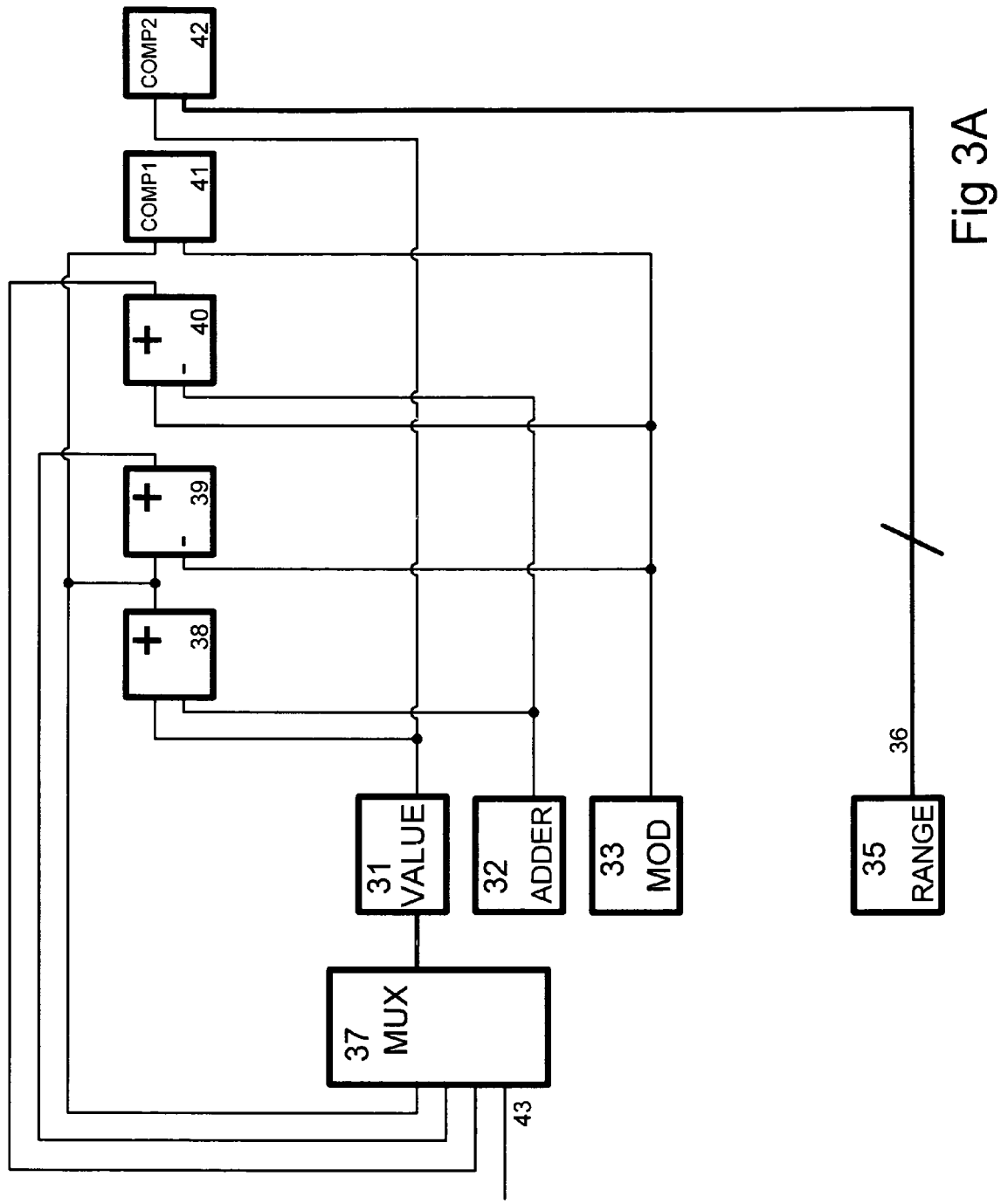
FIG. 3A illustrates an embodiment of a Phase Accumulator device at a register-transfer level.

FIG. 3A illustrates an embodiment of a Phase Accumulator device at the register-transfer level.

An accumulator memory, VALUE 31 can be used to store results of phase accumulator steps. An increment value can be provided by an increment memory, ADDER 32. A modulus value can be provided by MOD 33. A range specification can be provided by RANGE 35. RANGE 35 can comprise one or more specific values; these values can be communicated via a connection shown as element 36. A multiplexer MUX 37 can be employed to select one of several inputs that can be used to load the accumulator memory, VALUE 31. An adder 38 sums the contents of VALUE 31 and ADDER 32 to provide one of the inputs to MUX 37. Another adder 39 subtracts the contents of MOD 33 from the output of adder 38, providing the result as an input to MUX 37. Another adder 40 subtracts the contents of ADDER 32 from the contents of MOD 33, providing the result as an input to MUX 37. A comparator COMP1 41 compares the contents of MOD 33 and the output of adder 35. Another comparator COMP2 42 tests the contents of VALUE 31 against the range specified in RANGE 35.

The multiplexer MUX 37 can be employed to select one of several inputs to be loaded into the accumulator memory VALUE 31. These inputs include an arbitrary value shown as element 43.

In some embodiments phase accumulator memory VALUE 31 can be a register that can be clocked. Operations during a typical accumulator step can include selecting the multiplexer input corresponding to the sum of a present value of the contents of VALUE 31 and the contents of increment ADDER 32, shown as the output of the adder 38, and clocking the register. A typical rollover event in an accumulator step can occur when comparator COMP1 41 detects a sum output of adder 38 that is greater than the contents of MOD 33; in this case the multiplexer MUX 37 can select the output of adder 39 to load the register Value 31. The output of adder 39 supports a modulo counting function by subtracting the modulus (contents of MOD 33) from the sum of the accumulated phase held in VALUE 31 and the increment specified in ADDER 32.

In some embodiments the output of adder 40 can be selected to initialize the phase accumulator memory VALUE 31. In some embodiments a present value of the phase accumulator memory VALUE 31 can be tested by COMP2 42 against one or more values specified in RANGE 35 to support development of a Source Sequence Length.

It can be appreciated that in some embodiments it can be convenient to dispose a comparator such as COMP1 41 to compare the present value of VALUE 31 with the modulus of MOD 33, as an alternative and/or in addition to the arrangement shown in FIG. 3A.

Figure 3B:
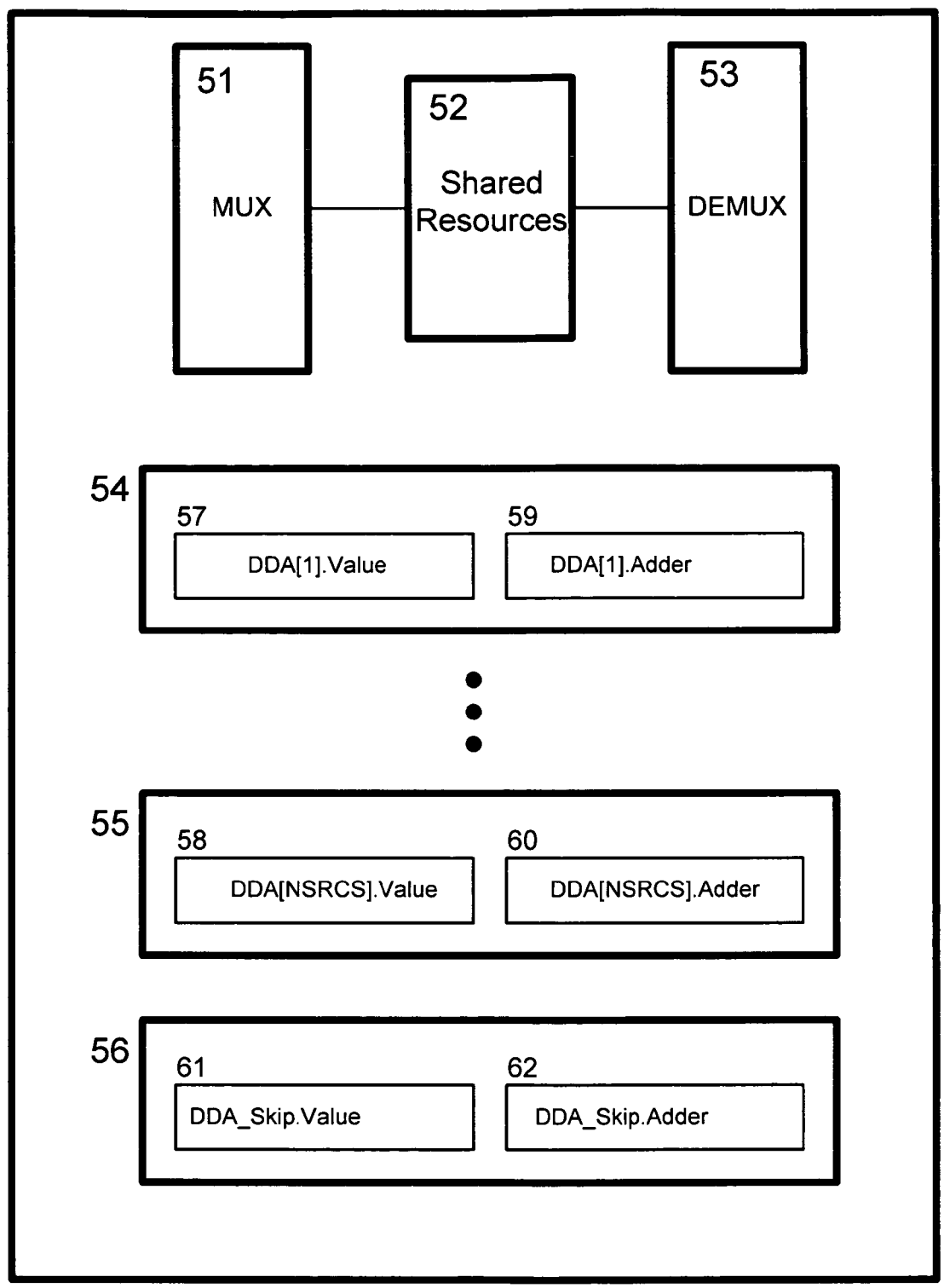
FIG. 3B illustrates a system embodiment.

Elements of a system embodiment are shown in FIG. 3B. Elements MUX 51, Shared Resources 52, and DEMUX 53, can function as corresponding elements MUX 10, Shared Resources 11, and DEMUX 12, function in FIG. 1, previously described. A plurality of phase accumulators are shown as elements 54, 55, and 56. In some embodiments each phase accumulator within the system shown in FIG. 3B can comprise the properties and functionality of the phase accumulator described in FIG. 3A. It can be appreciated that FIG. 3B provides for alternative system embodiments comprising a varying number of phase accumulators. That is, as the number of sources NSRCS varies, so can the number of corresponding phase accumulators, as shown by ellipsis in FIG. 3B.

A source sequence length SSL value can be developed to support advantageous system properties that are described above.

A plurality of phase accumulators can be employed for this purpose. Accumulator memory and increment memory can be provided that correspond to each of the logical streams L[i], for i=1, . . . , NSRCS, where NSRCS is the quantity of logical streams, as shown in phase accumulators 54 and 55 in FIG. 3B. These accumulator memories are notated as DDA [i].Value (DDA[1].Value 57 and DDA[NSRCS].Value 58) and the increment memories as DDA[i].Adder (DDA[1] .Adder 59 and DDA[NSRCS].Adder 60). An accumulator memory DDA_Skip.Value 61 and an increment memory DDA_Skip.Adder 62 can be provided that correspond to the input capacity remaining after the demand for every logical stream L[i] is taken into account. DDA_Skip.Value 61 DDA_Skip.Adder 62 can be disposed within phase accumulator 56. In the event that there is essentially no input capacity remaining after the demand for every logical stream L[i] is taken into account, the determination of SSL value herein described can be performed omitting references to DDA_Skip.Value and DDA_Skip.Adder.

Initial values for the increment memories DDA[i].Adder and DDA_Skip.Adder can be calculated as described above in Equations 1 and 2.

A MAX_SSL parameter can be provided to set an arbitrary upper bound for the value of the source sequence length SSL.

A MaxPhase parameter can be provided to set an arbitrary upper bound for the size of a "phase error" that will be tolerated in each of the phase accumulators upon determining a specific value for SSL. This is shown in an embodiment FIG. 10 "Case 2".

SSL can be initialized to a value of zero prior to the calculations subsequently described here.

Each of the accumulator memories DDA[i].Value and DDA_Skip.Value can be set to an arbitrary initial value in the range of 0 to DDA_MAX. In some embodiments the initial values provided can be essentially one increment less than the rollover value MAX_DDA, in order to cause a rollover upon the occurrence of a first increment event. That is, in some embodiments each DDA[i].Value can be set to the value of (DDA_MAX−DDA[i].Adder) for each i=1, . . . , NSRCS, and, DDA_Skip.Value can be set to the value of (DDA_MAX−DDA_Skip.Addr). This is shown in an embodiment FIG. 8 "Update".

Phase accumulation steps can be repeated until one or more specified criteria are achieved, such as those criteria parameterized by MAX_SSL and MaxPhase. This capability is shown in an embodiment, FIG. 11 "Determine Source Sequence Length", FIG. 12 "Step DDAs", and FIG. 13 "Check Phase".

In each phase accumulation step an incremented value can be calculated for each of the phase accumulators; each incremented value is the sum of the accumulator memory value and the respective increment memory value. The accumulator memory value can be updated with the incremented value modulo the maximum phase MAX_DDA. That is, if the incremented value is greater than or equal to the maximum phase MAX_DDA, the maximum phase MAX_DDA can be subtracted from the incremented value and the result can be stored in the accumulator memory. The term "rollover" can be used to identify instances wherein MAX_DDA is subtracted as described. By way of non-limiting example, in an embodiment where all of the referenced parameters are integers, this arithmetic step of incrementing the accumulator memory value in each of the phase accumulators can be informally expressed in the C programming language as:

for (i=1; i<=NSRCS; i++) DDA[i].Value=(DDA[i].Value+ DDA[i].Adder) % MAX_DDA;
DDA_Skip.Value=(DDA_Skip.Value+DDA_Skip.Adder) % MAX_DDA;

Also, for each occurrence of a rollover in any of the phase accumulators, the value of the source sequence length parameter SSL can be increased by one. These capabilities are shown in an embodiment FIG. 12 "Step DDAs".

To conclude each iteration of a phase accumulation step, specific criteria can be tested in order to detect a suitable value for SSL. In some embodiments detection of the condition of SSL exceeding an arbitrary maximum value MAX_SSL can be used to terminate the calculation of SSL. That is, in the event that the source sequence length SSL resulting from these operations exceeds MAX_SSL, SSL can be assigned the value of MAX_SSL. In some embodiments, detecting the condition of one or more of the phase accumulator memories each having a value within a specified arbitrary range can terminate the calculation of SSL.

By way of non-limiting example, in some embodiments if all of each DDA[i].Value, and, DDA_Skip.Value all have values that are less than an arbitrary threshold MaxPhase, a calculation of SSL can be complete. This capability is shown in an embodiment FIG. 13 "Check Phase".

In some embodiments, in the event that iterations of phase accumulator steps result in a SSL value exceeding MAX_SSL and at the same time the phase accumulator memory values do not lie within a range parameterized by MaxPhase, the value of MaxPhase can be increased and the determination of SSL value begun anew. In some embodiments the value of MaxPhase can be adjusted by a fixed ratio. It can be appreciated that in some embodiments MaxPhase can be adjusted in an alternative manner.

By way of non-limiting example, denoting the fixed ratio of increase as MAX_PHASE_MULT, the update of MaxPhase can be informally expressed in the C programming language as MaxPhase*=MAX_PHASE_MULT. This capability is shown in an embodiment FIG. 10 "Case 2".

In some embodiments a value of SSL can be determined that corresponds to selecting an optimum count of phase accumulator steps. A sequence of phase accumulator steps can be performed, up to an arbitrary limit on the count of steps. An optimal step count can be selected on the basis of choosing the step count at which certain conditions are optimized, over the range of counts through the arbitrary limit. In some embodiments the conditions to optimize can be a minimum of the combined phase accumulator memory values. The calculation of a parameter to minimize can be a sum or any other known and/or convenient method of evaluating the combination of phase accumulator memory values, such as by way of non-limiting example, RMS (root of the mean square). In some embodiments, parameterization of the combined phase accumulator memory values can exclude those values corresponding to skip processes, that is, the parameterization does not necessarily take into account DDA_Skip.Value.

A SSL value developed as shown can specify the length of a source sequence list SO[ ]; the source sequence list can be developed with further operations as described herein.

The increment memory values DDA[i].Adder (i=1, . . . , NSRCS) and DDA_Skip.Adder (when applicable) can remain, calculated as described in the above discussion including Equations 1 and 2.

In the event that there is essentially no input capacity remaining after the demand for every logical stream L[i] is taken into account, the determination of source sequence list SO[ ] herein described can be performed omitting references to DDA_Skip.Value and DDA_Skip.Adder.

Each of the accumulator memories DDA[i].Value and DDA_Skip.Value can be set to an arbitrary initial value in the range of 0 to DDA_MAX. In some embodiments the initial values provided can be essentially one increment less than the rollover value MAX_DDA, in order to cause a rollover upon the occurrence of a first increment event. That is, in some embodiments each DDA[i].Value can be set to the value of (DDA_MAX−DDA[i].Adder) for each i=1, . . . , NSRCS, and, DDA_Skip.Value (if applicable) can be set to the value of (DDA_MAX−DDA_Skip.Addr). This capability is shown in an embodiment FIG. 15 "Reset DDAs".

It can be appreciated that in some embodiments the accumulator memories DDA[i].Value and DDA_Skip.Value can be initialized to, and/or retain, values remaining at the conclusion of prior operations. By way of non-limiting example, the state of accumulator memories can be stored at the end of a preceding development of SSL value, and can be restored at the beginning of a subsequent development of another SSL value. By way of non-limiting example, the state of accumulator memories can be stored at the end of a preceding development of a set of source sequence list values, and restored at the beginning of a subsequent development of another set of source sequence list values.

Phase accumulation steps can be repeated until each of the elements of the source sequence list SO[j] (for j=1, . . . , SSL) is determined. A source order index "INDEX" can be initialized such that SO[INDEX] references the first element of the source sequence list. A "COUNT" parameter can be initialized with the value of SSL.

In each phase accumulation step an incremented value can be calculated for each of the phase accumulators; each incremented value is the sum of the accumulator memory value and the respective increment memory value. The accumulator memory value can be updated with the incremented value modulo the maximum phase MAX_DDA.

Figure 16:
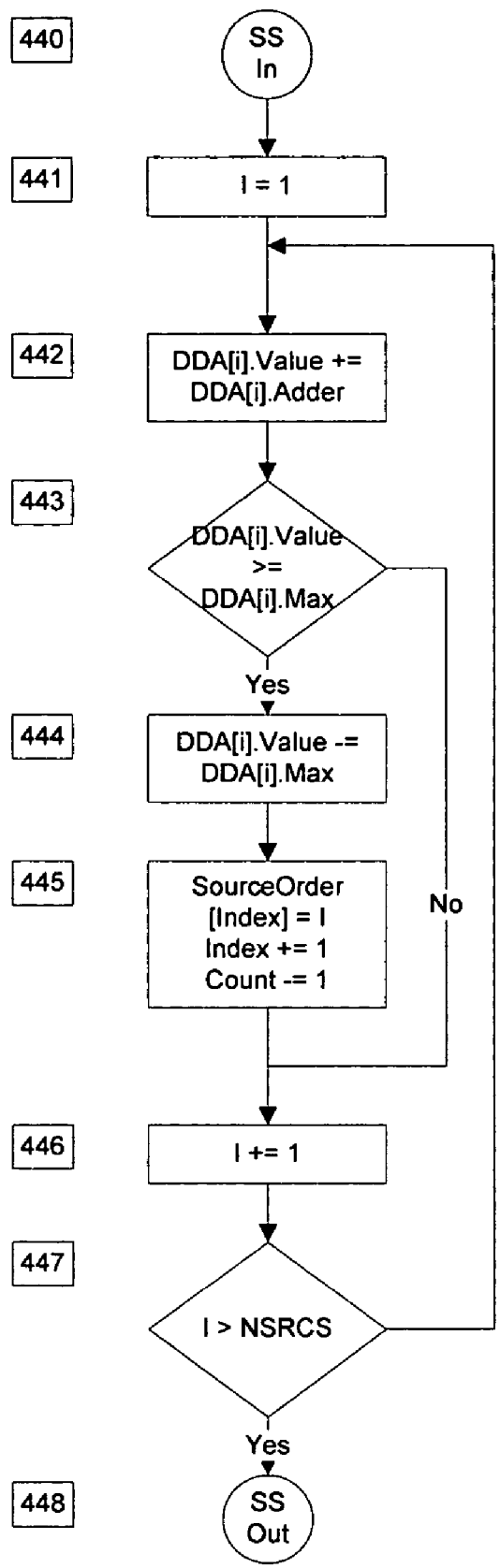
FIG. 16 illustrates (Create) Step Sources (SS)

By way of non-limiting example, in an embodiment where all of the referenced parameters are integers, this arithmetic step of incrementing the accumulator memory value in each of the phase accumulators can be informally expressed in the C programming language as:

for (i=1; i<=NSRCS; i++) DDA[i].Value=(DDA[i].Value+DDA[i].Adder) % MAX_DDA;

DDA_Skip.Value=(DDA_Skip.Value+DDA_Skip.Adder) % MAX_DDA;

The functionality of each line of code above is shown in embodiments: FIG. 16 "Step Sources" and FIG. 17 "Step Skip", respectively.

Within each phase accumulation step, and upon each occurrence of a rollover in each one of the phase accumulators, several actions can be initiated:

1. SO[INDEX] can be assigned a value corresponding to the associated phase accumulator and thus with the associated input stream (when applicable). That is, when the ith phase accumulator experiences a rollover, SO[INDEX] can be assigned the value of "i". When the "Skip" phase accumulator experiences a rollover, SO[INDEX] can be assigned a value that is reserved for indicating a Skip operation.

2. Increment INDEX by one.

3. The "COUNT" value can be decremented by one and tested. When COUNT reaches a value of zero, all elements of SO[ ] have been determined.

A feedback term denoted "Efficiency" represents the ratio of the frame rate actually achieved vs. the maximum frame rate that can be provided by an input source. The initial value of the "Efficiency" term can be an estimate based on the total number of input sources to be multiplexed for a specific platform. Other factors can be taken into account, such as the variance in frame rates among the various sources, or past performance. A particular value chosen to represent Efficiency can be primarily a reflection of the underlying multiplexing and/or synchronization mechanisms, and can vary greatly. "Efficiency" can be lesser or greater under the condition of inputs switching, as compared to the condition of a single non-multiplexed input stream.

The "Efficiency" feedback term can be updated by one or more feedback loops. In some embodiments, two loops can be used: a long term loop, and a short term loop. A long term loop can typically be the entire time that an input stream is active. A short term loop can typically be 10 to 60 seconds. Feedback can be applied when a source order sequence transitions from the last element of a Source Sequence List to the first element of a Source Sequence List, in order to minimize the phase error. However, in some embodiments, any convenient time intervals can be used for loop lengths and any convenient number of loops can be used.

Figure 4:
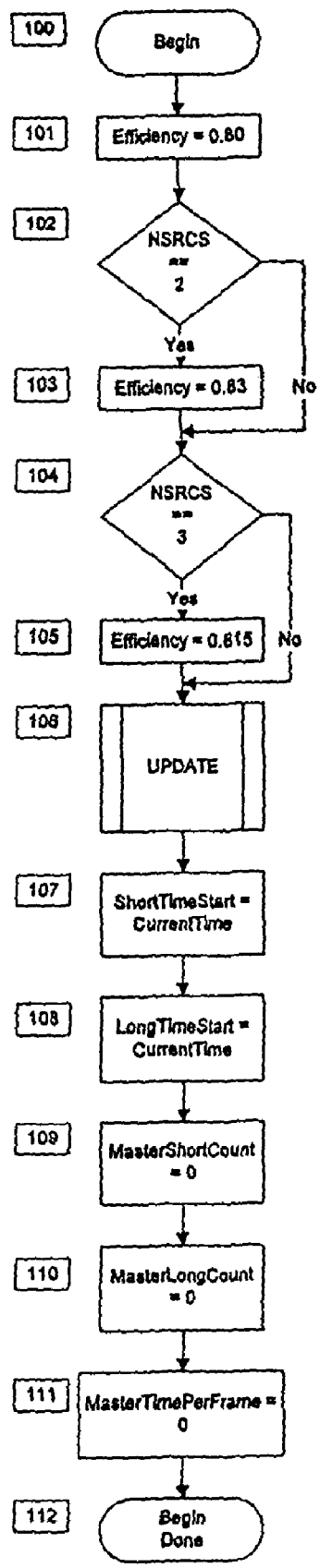
FIG. 4 illustrates (Main) "Begin" Dispatch

Initialization of "Efficiency" and feedback loop parameters is shown in an embodiment FIG. 4 "Begin".

Each feedback loop can be represented by an average time per frame over the loop period for a "Master" stream. A "Master" stream can be identified as the logical stream having the largest frame rate, that is, having the smallest time per frame. Frames captured for a master stream can be counted for each loop, and the starting time of the loop, relative to the start of the master stream, can also be determined. In some embodiments, a long term loop can use the same start time, but the short loop can use the end time of the previous loop as the start time for a next loop. An average time per loop, for either type of loop, can be computed as:

AverageTimePerLoop=(LoopEndTime−LoopStartTime)/MasterFramesCaptured.

The AverageTimePerLoop terms can be applied to the "Efficiency" feedback term in a weighted manner. The short term can typically be weighted more than the long term, and can be expressed as:

Efficiency(t)=(Efficiency(t−1)*MasterStreamTimePerFrame)/(SHORT_WEIGHT*AvgTimePerLoop (short+LONG_WEIGHT*AvgTimePerLoop (long)), where MasterStreamTimePerFrame is defined as 1/RL[m], where m is the index of the master stream.

Figure 7:
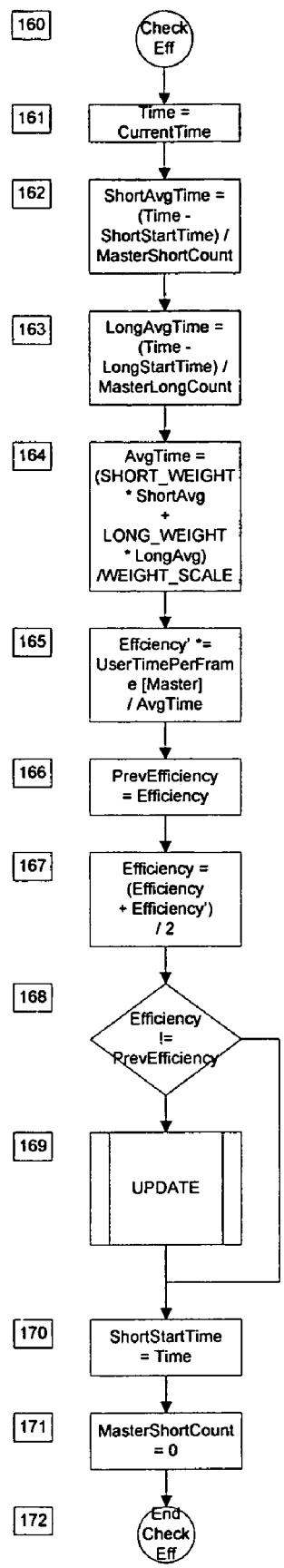
FIG. 7 illustrates (Main) CheckEff

Computations of AverageTimePerLoop and Efficiency as just described are shown in an embodiment FIG. 7 "Check Efficiency".

A source sequence order, that is, a Source Sequence List, can then be developed applying the new Efficiency term and capture processes can continue using the new Source Sequence List.

The Efficiency term is shown entering into the development of a Source Sequence List in an embodiment FIG. 8 "Update", in element 207, as "Efficiency".

It can be appreciated that a Source Sequence List can be developed dynamically in response to a change in Efficiency, and as a response to other dynamic changes in condition, in a system embodiment.

In an embodiment, an input multiplexer can respond to the elements of a first Source Sequence List in an ordered sequence indexed by a Source Order Index. A first Source Sequence List can be exhausted in this manner, that is, all of the elements of a first Source Sequence List, up to and including the last element can be used. (The last element of a Source Sequence List can have a Source Sequence Index of Source Sequence Length (SSL) value). The capture process can continue by again using the first element of the same (first) Source Sequence List, or, by using the first element of a second Source Sequence List. In short, there can be a transition from the end of one list to the beginning of the same list, or, there can be a transition from the end of a first list to the beginning of a second list. The first type of transition can be labeled "repeat", and the second labeled "refresh".

It can be advantageous to take steps within the development of the Source Sequence List to minimize and/or limit the amount of phase noise associated with one or both types of transitions. Phase noise can be thought of as an irregularity in the regular progression of values in the phase accumulator memories. That is, outside of a transition as described, the value of each accumulator's contents progresses linearly with each step; the 'phase difference' between successive steps is a constant. (Note that the accumulator's contents advance linearly, modulo a modulus.) At a transition between computing succeeding Source Sequence Lists, this linearity can be distorted. This distortion can distort the regularity, that is, periodicity, with which particular input stream selections occur, because the selections of particular input streams is responsive to Source Sequence Lists.

In the case of a 'repeat transition' it can be advantageous to minimize the phase noise occurring between the last accumulator step of the computation, and the first accumulator step of the computation, for a (first) Source Sequence List.

In the case of a 'refresh transition' it can be advantageous to minimize the phase noise occurring between the last accumulator step of the computation for a first Source Sequence List, and the first accumulator step of the computation for a second Source Sequence List. In some embodiments this can be accomplished by simply providing continuity in the phase accumulator memories between the last accumulator step and the following first accumulator step. A non-limiting example is described here for a case where the modulus of the phase accumulator remains constant between the successive list computations. Simply put, an embodiment can provide for the phase accumulator memory value for the Accumulator Step Index "1" of the new list computation to be the sum of the last indexed phase accumulator memory value of the previous list computation and a (possibly new) increment corresponding to the new list computation. Rollovers can propagate in the usual manner, starting with that first step. In this manner, no accumulated phase is lost—there is essentially zero phase error due to the occurrence of the 'refresh transition'.

Figure 5:
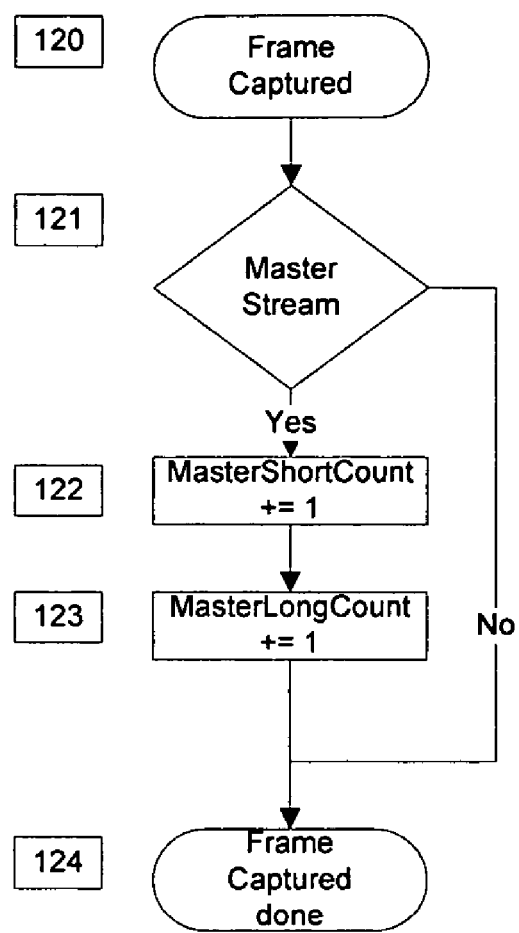
FIG. 5 illustrates (Main) "Frame Captured" Dispatch
Figure 6:
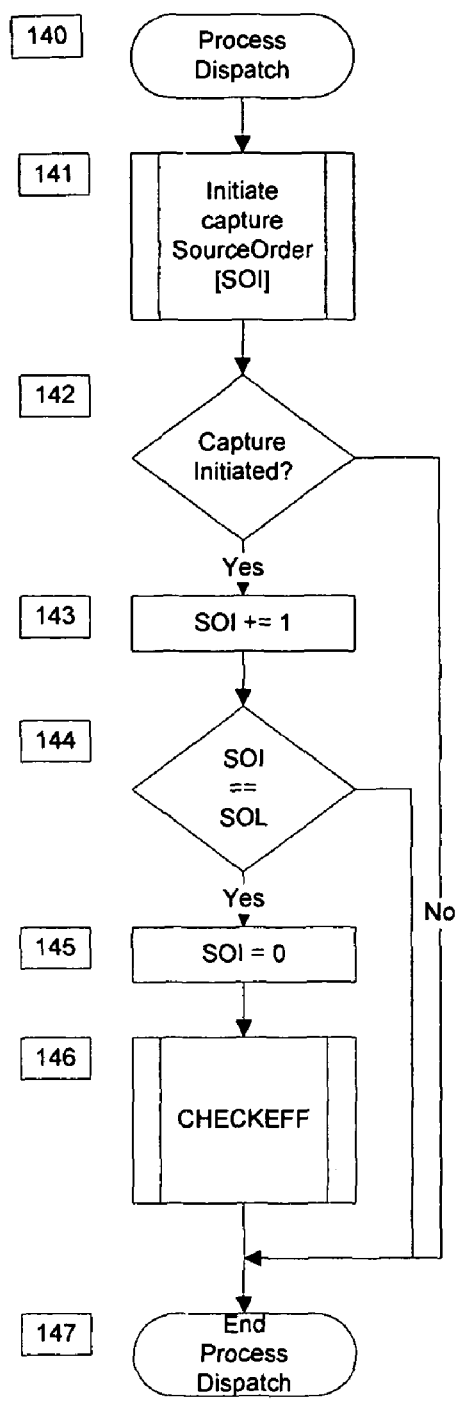
FIG. 6 illustrates (Main) "Process" Dispatch

FIGS. 4, 5, and 6, taken together, show an embodiment in the context of an AVStream driver architecture for MS Windows. There are 3 dispatches shown: FIG. 4 "Begin", FIG. 5 "Frame Captured", and FIG. 6 "Process". In some embodiments these dispatches can be serialized. "Begin" can be invoked when anything changes that would affect the source order, such as adding a logical stream, removing a logical stream, or changing the frame rate of a logical stream. "Frame Capture" can be invoked at the completion of each frame captured. "Process" can be invoked as part of the AVStream Process Dispatch method, which represents the event of an empty frame buffer being made available, or an explicit request made by the driver to itself to cause the next frame to be queued for capture.

FIG. 4: (Main) "Begin" Dispatch 100

The purpose of this dispatch is to establish a new "SourceOrder", and initialize the feedback paths.

Elements 101 through 105 control the initialization of the value of "Efficiency", which represents of efficiency of the frame grab rate in switching mode relative to maximum frame rate of the Master source.

Element 106 refers to the "Update" method, described herein.

Elements 107 through 111 initialize the counts and timestamps for feedback paths. The drawings illustrate 2 feedback paths, but an arbitrary number of feedback paths are possible.

FIG. 5: (Main) "Frame Captured" Dispatch 120

The purpose of this dispatch is to count the frames captured for the Master stream, to be used as feedback terms when the Source Order is updated.

Element 121 determines if the dispatch is associated to the Master stream. If not, then the dispatch is complete.

Elements 122 through 123 update the frame counters associated to the feedback loops.

FIG. 6: (Main) "Process" Dispatch 140

The purpose of this dispatch is to initiate the next capture using the SourceOrder [SOI] to define the source index, or skip command, and to update the SOI if the initiation of the next capture was successful.

Element 141 initiates the next capture or skip, as defined by SourceOrder [SOI]. Element 141 can indicate if a capture or skip was initiated.

Element 142 checks if capture/skip was initiated by Element 141. If nothing was initiated, then "Process Dispatch" is complete.

Element 143 increments the Source Order Index (SOI)

Element 144 checks for SOI wrap. If SOI does not wrap, then "Process Dispatch" is complete.

Element 145 resets SOI after it has wrapped.

Element 146 checks for a change to the efficiency of capture, based on the feedback loops, as described below, and "Process Dispatch" is concluded.

FIG. 7: (Main) "CheckEff" 160

The purpose of this sequence is to determine if the capture efficiency has changed, and if so, cause a new SourceOrder, that is, a Source Sequence List, SO[ ], to be created. CheckEff is invoked on SourceOrder wrap, to minimize phase changes when the SourceOrder is updated. In some embodiments, CheckEff does not need to be invoked on every SourceOrder wrap. A typical implementation can provide that a minimum time, as measured by an integer number of SourceOrder wraps, has occurred. The reason for this is to provide the best time interval for the feedback loop(s).

Element 161 reads the Current Time to "Time". (The implementation of reading time is system dependent. It can be advantageous to use a clock associated to the stream frame rate measurement.)

Element 162 determines the average time per frame for the short feedback loop.

Element 163 determines the average time per frame for the long feedback loop.

Element 164 computes an aggregate average time per frame from weighted values of the average time per frame values of the short and long feedback loops. The relative weights can be adjusted to emphasize long or short term stability of the frame rate. WEIGHT_SCALE can be used to normalize of SHORT_WEIGHT and LONG_WEIGHT.

Element 165 computes the Efficiency of the Master logical stream.

Element 166 saves the previous Efficiency value for the Master logical stream Element 167 computes the new Efficiency of the Master logical stream, as the average of the current and previous efficiency values, which can aid in preventing overshoot. This step can be omitted to speed up the feedback loops.

Element 168 compares the previous and current Efficiency values, and causes an "Update" to be performed if the values are different.

Element 169 represents an update of the SourceOrder, which is described below.

Element 170 through 171 update the feedback terms for the short feedback loop.

FIG. 8: (Update) "Update" 200

The purpose of this sequence is to initialize the capture and skip DDAs, and determine which Source Sequence case to apply.

Element 201 examines the total number of logical streams (NSRCS). If there is a single source, then source switching may not apply, and further operations are referred to Element 202.

Element 203 resets DDA_Grab.Adder, which will be used to accumulate the aggregate Adder terms for all the logical streams.

Element 204 sets DDA_Grab.Max to the max value. MAX_DDA can be an arbitrary value, such as 10,000,000, or could be chosen for a property, such as easy carry detection.

Element 205 initializes the logical stream index to 1.

Element 206 initializes the DDA.Max term for the logical stream to MAX_DDA.

Element 207 sets the DDA.Adder term for the ith logical stream. RL[i] represents the specified frame rate for the ith logical stream, L[i]. RSn[i] represents the nominal frame rate for the ith input stream.

Element 208 initializes the DDA.Value term so that a grab can occur on the first iteration of the DDA. This can provide for all of the logical streams to be in phase when the SourceOrder rolls over, and can simplify detection that every logical stream has a grab in the SourceOrder.

Element 209 accumulates the aggregate Adder term for all logical channels.

Element 210 increments the logical stream index.

Element 211 checks that all logical streams have been processed, if not continue with element 206, and if so continue with element 211.1

Element 211.1 initializes DDA_Skip.Adder.

Element 211.2 initializes DDA_Skip.Value.

Element 212 checks if the aggregate accumulated grab adder term for all logical streams exceeds the maximum. If so, then perform "Case 3" followed by "Case 2", if not, proceed directly to "Case 2".

Element 213 is concerned with the processing of "Case 3", where not all UserTimePerFrame values can be achieved, and is explained below.

Element 214 is concerned with "Case 2", which is defined below.

FIG. 9: (Update) "Case 3" 220

The purpose of this sequence is to scale back the requested frame rates when the aggregate UserTimePerFrame exceeds the maximum possible switching capabilities. In some embodiments, each logical stream is slowed down by the same scale factor.

Element 221 initializes the logical stream index to 1.

Element 222 scales the Adder term for the logical stream to a smaller value, by the ratio of the maximum DDA value to the aggregate grab adder term.

Element 223 initializes the DDA.Value term so that a grab will occur on the first iteration of the DDA.

Element 224 increments the logical stream index.

Element 225 checks that all logical streams have been processed, if not continue with element 222, and if so the sequence is completed.

Element 225.1 initializes DDA_Skip.Adder.

Element 225.2 initializes DDA_Skip.Value.

Figure 10:
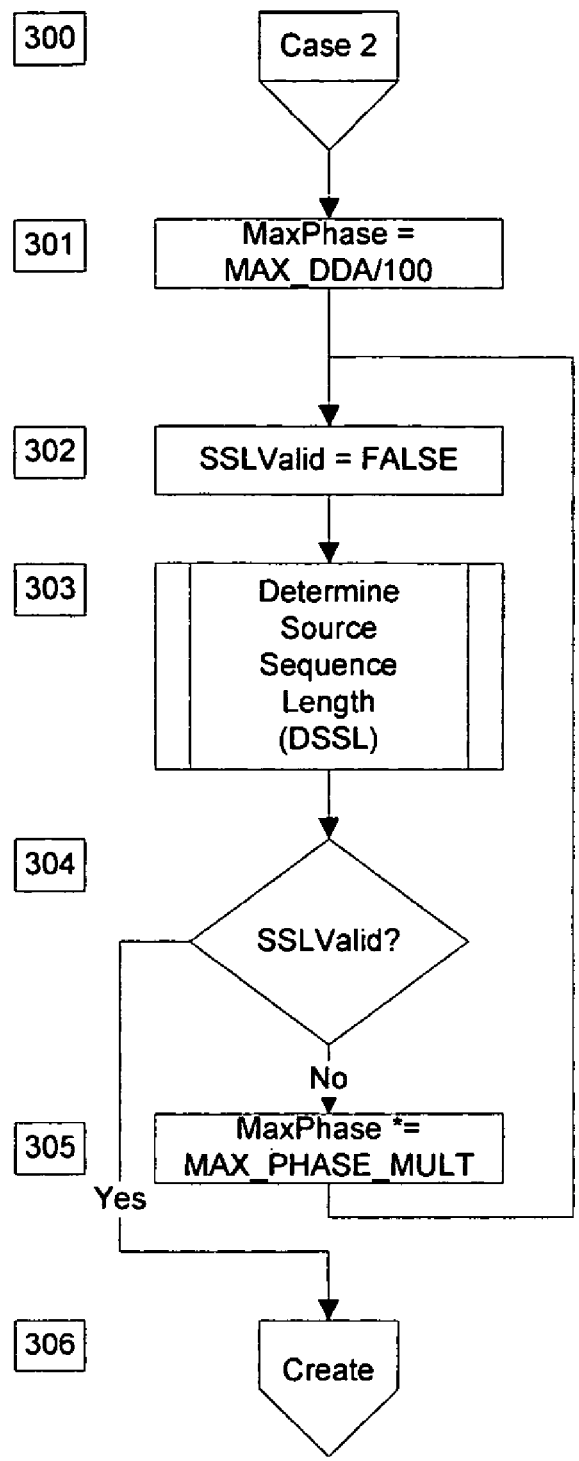
FIG. 10 illustrates (Case 2) Case 2

FIG. 10: (Case 2) "Case 2" 300

The purpose of this sequence is to iterate source orders until a minimum phase error is achieved.

Element 301 initializes the MaxPhase to 1% of the MAX_DDA. This value can be arbitrary or prescribed, but in some embodiments can be in the range of about 1 to about MAX_DDA. Smaller values will cause more iterations than larger values, but could potentially result in a smaller phase error.

Element 302 initializes SSLValid to FALSE, indicating that the current Source Sequence Length is not valid.

Element 303 represents a sequence to determine the SSL (Source Sequence Length) from the current settings. This sequence is described below.

Element 304 checks for SSLValid, and if so, continues with Element 306 to create the sequence, otherwise continue with Element 305 for iteration.

Element 305 scales the MaxPhase by a constant MAX_PHASE_MULT, which is typically 1.1, but can be any value larger than 1. Smaller values can cause more iterations, but in some circumstances result in a smaller phase error. Following Element 305, iterate with Element 302.

Figure 11:
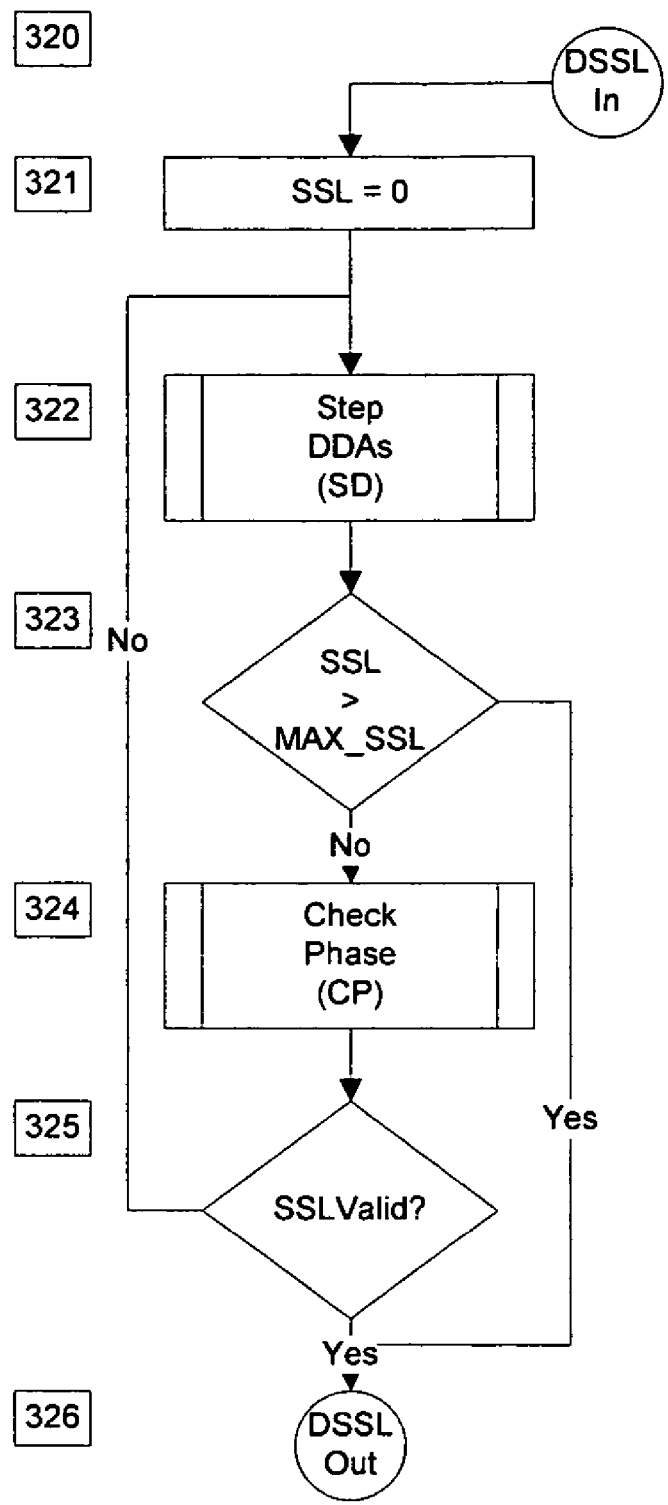
FIG. 11 illustrates (Case 2) Determine Source Sequence Length (DSSL)

FIG. 11: (Case 2) Determine Source Sequence Length (DSSL) 320

The purpose of this sequence it to determine the length of the source sequence given the current settings.

Element 321 initializes the SSL (Source Sequence Length) to 0.

Element 322 represents a sequence to step the grab and skip DDAs, and is described below.

Element 323 checks if the SSL exceeds the maximum allowed value. If so the sequence is complete, otherwise continue with Element 324

Element 324 represents a sequence that checks the phase to determine if additional iteration is required, and is described below.

Element 325 checks for SSLValid, and if so the sequence is complete, otherwise iteration is performed to Element 322.

Figure 12:
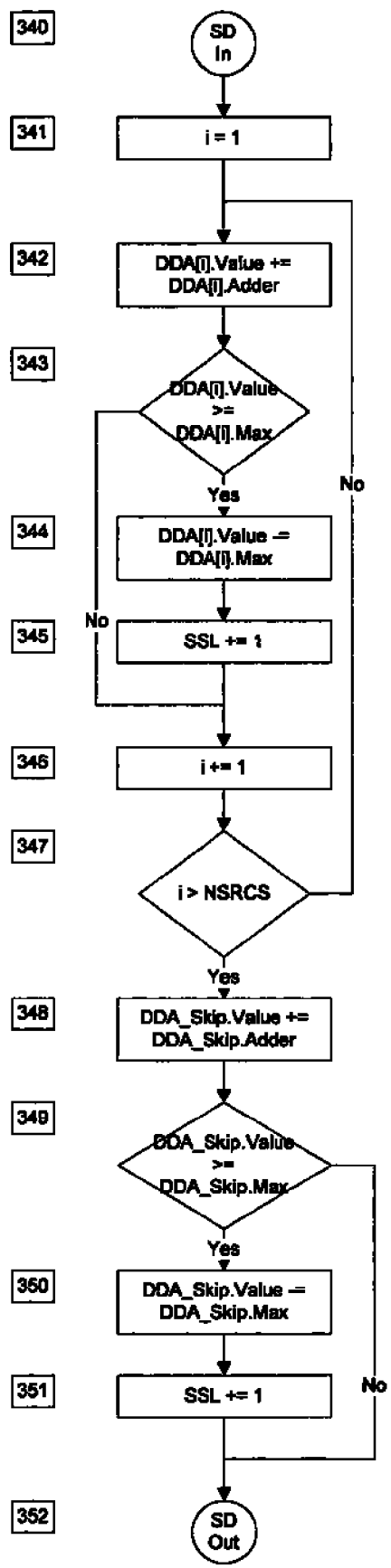
FIG. 12 illustrates (Case 2) Step DDAs (SD)

FIG. 12: (Case 2) Step DDAs (SD) 340

The purpose of this sequence is to step the values of the logical stream and grab DDAs.

Element 341 can initialize the logical stream index to a specific value, such as 1.

Element 342 steps the logical stream DDA value.

Element 343 checks for the logical stream DDA value exceeding the DDA Max. If so, then continue with Element 344, otherwise Element 345.

Element 344 subtracts the DDA Max from the DDA value.

Element 345 increments the SSL, indicating that the logical stream source would be the next source.

Element 346 increments the logical stream index for iterating the next logical stream.

Element 347 checks for the logical stream index exceeding the number of logical streams (NSRCS). If so, then logical stream iteration is complete, continue with element 348, otherwise iterate for the next logical stream with element 342.

Element 348 steps the Skip DDA.

Element 349 checks for the Skip DDA value exceeding the DDA Max. If so, then continue with Element 350, otherwise the sequence is complete.

Element 350 subtracts the DDA Max from the Step DDA value.

Element 351 increments the SSL, indicating that a Skip would be performed next.

Figure 13:
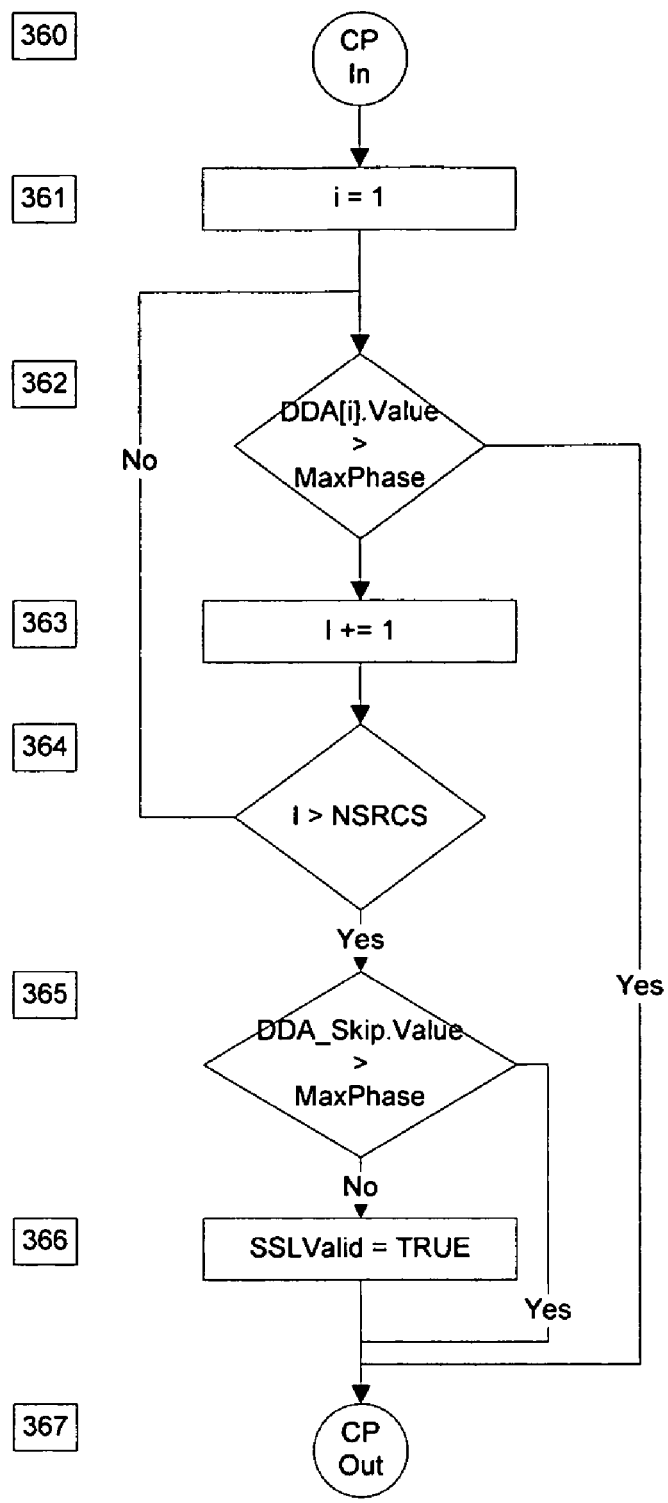
FIG. 13 illustrates (Case 2) Check Phase (CP)

FIG. 13: (Case 2) Check Phase (CP) 360

The purpose of this sequence is to check the phase of all logical streams and the Skip, and set the SSLValid flag if all the phases are below the maximum, indicating that the Source Sequence is complete.

Element 361 can initialize the logical stream index to a specific value, such as 1.

Element 362 checks if the DDA Value for the logical stream exceeds the maximum phase error, and if so, the sequence is complete, otherwise continue iterating the logical streams with Element 363.

Element 363 increments the logical stream index for iterating the next logical stream.

Element 364 checks for the logical stream index exceeding the number of logical streams (NSRCS). If so, the logical stream iteration is complete, continue with element 365, otherwise iterate for the next logical stream with element 362.

Element 365 checks if the Skip DDA Value exceeds the maximum phase error, and if so the sequence is complete, otherwise continue with Element 366.

Element 366 sets the SSLValid flag, indicating that the current settings resulted in a valid SSL value.

Figure 14:
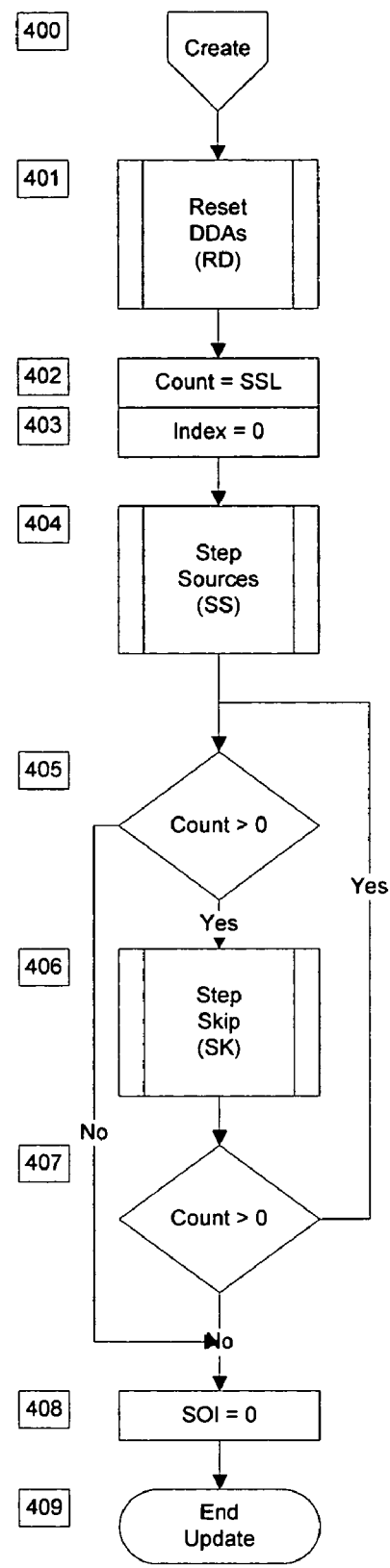
FIG. 14 illustrates (Create) Create

FIG. 14: (Create) Create 400

The purpose of this sequence is to create a Source Order from the current settings.

Element 401 represents a sequence which resets the DDAs for the logical channel, and Skip, which is described below.

Element 402 initializes Count to SSL.

Element 403 resets the source sequence Index.

Element 404 represents a sequence which steps the logical stream DDAs, which is described below.

Element 405 checks for a non-zero Count, and if so proceeds to Element 406, otherwise Element 408.

Element 406 represents a sequence which steps the Skip DDA, which is described below.

Element 407 checks for a non-zero Count, and if so proceeds to Element 405 to continue iteration, otherwise Element 408.

Element 408 resets the Source Order Index (SOI) so that source switching can proceed for the new Source Order.

Figure 15:
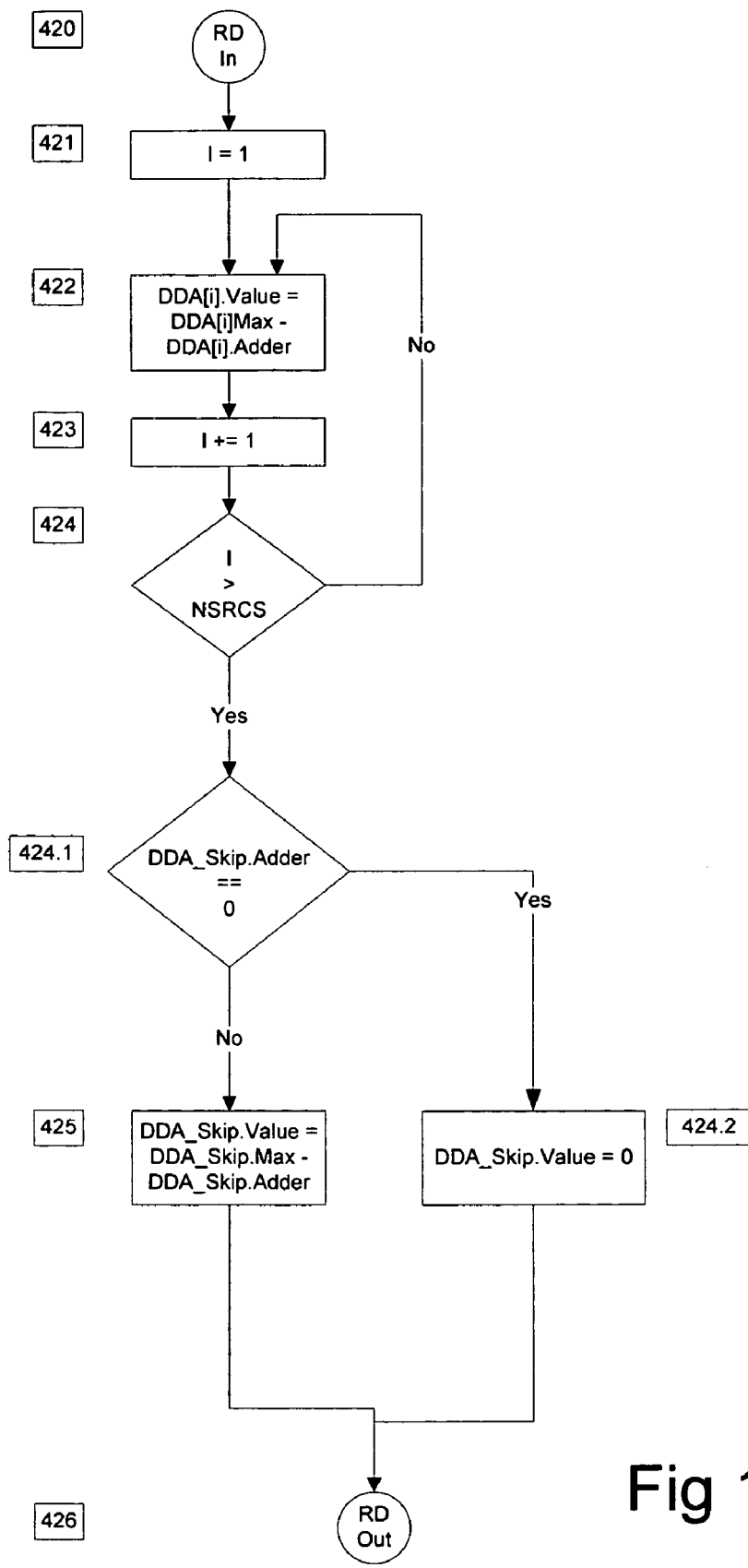
FIG. 15 illustrates (Create) Reset DDAs (RD)

FIG. 15: (Create) Reset DDAs (RD) 420

The purpose of this sequence is to reset the logical stream and Skip DDAs.

Element 421 can initialize the logical stream index to a specific value, such as 1.

Element 422 sets DDA Value for the logical stream, so that the initial step can result in a source order entry for the logical stream. This can be necessary in order to minimize the phase error when the Source Order wraps.

Element 423 increments the logical stream index for iterating the next logical stream.

Element 424 checks for the logical stream index exceeding the number of logical streams (NSRCS). If so, the logical stream iteration is complete, continue with element 424.1, otherwise iterate for the next logical stream with element 422.

Element 424.1 checks for a special value (0) of DDA_Skip.Adder that indicates Skip entries are not to be made in the source sequence list. If the special value is present then control flows to element 424.2. If the special value is not present then control flows to element 425.

Element 424.2 initializes DDA_Skip.Value to zero. With DDA_Skip.Value and DDA_Skip.Adder both equal to zero, no source sequence list entries will be made for Skip processes.

Element 425 sets the DDA Value for the Skip, so that the initial step will result in a skip. There is an exception, which is not shown in the drawing, if the DDA Adder value is equal to a prescribed value, such as 0, which indicates that no Skips are to be performed. In this case, the DDA Value is initialized to 0.

FIG. 16: (Create) Step Sources (SS) 440

The purpose of this sequence is to step the logical stream DDAs, and emit SourceOrder entries as needed.

Element 441 can initialize the logical stream index to a specific value, such as 1.

Element 442 Steps the DDA for the logical stream.

Element 443 checks for the DDA Value exceeding the DDA Maximum for the logical stream, and if so proceeds to Element 444, otherwise continue iterating the logical streams at Element 446.

Element 444 subtracts the Maximum value from the DDA Value for the logical stream.

Element 445 emits a SourceOrder entry for the current logical stream, increments the Index, and decrements the Count.

Element 446 increments the logical stream index for iterating the next logical stream.

Element 447 checks for the logical stream index exceeding the number of logical streams (NSRCS). If so, the iteration is complete, and the sequence is complete, otherwise continue iteration at Element 442.

Figure 17:
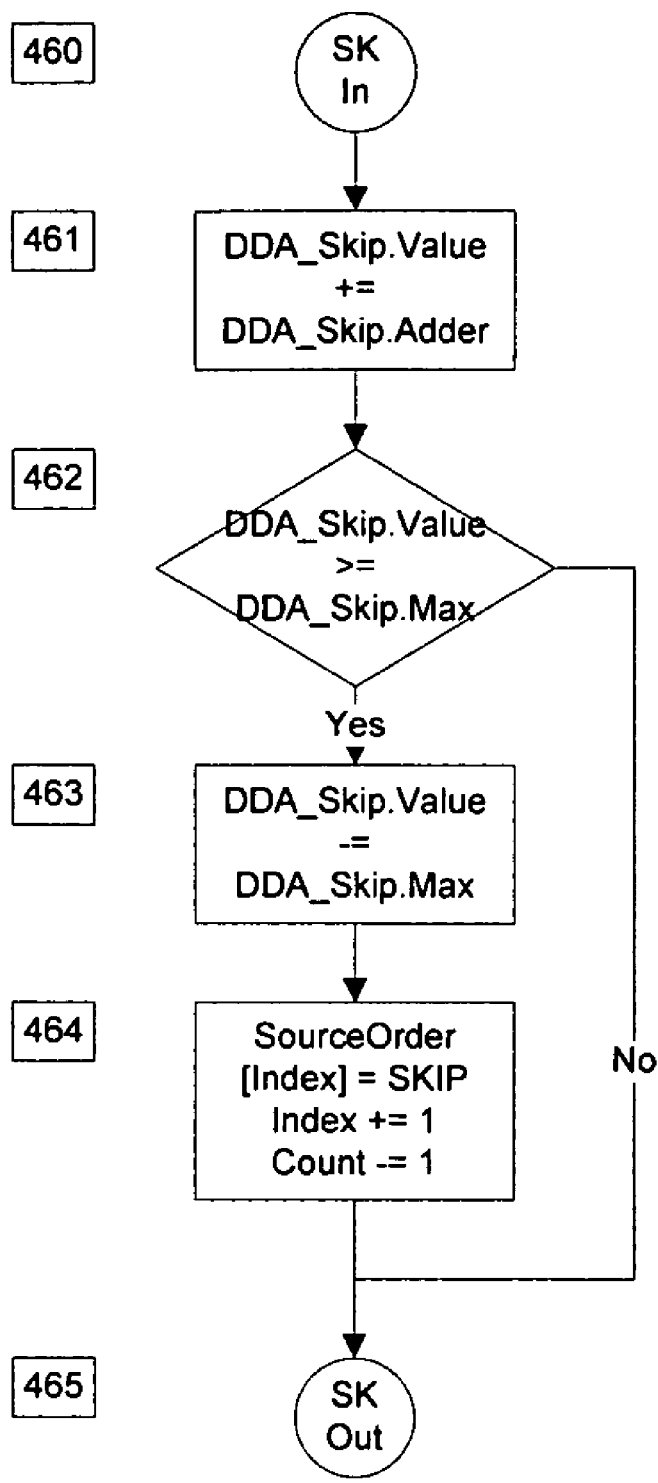
FIG. 17 illustrates (Create) Step Skip (SK)

FIG. 17: (Create) Step Skip (SK) 460

The purpose of this sequence is to step the Skip DDA, and emit a Skip to the SourceOrder as needed.

Element 461 Steps the DDA for Skip.

Element 462 checks for the Skip DDA Value exceeding the DDA Maximum, and if so the sequence is complete, otherwise continue with Element 463.

Element 463 subtracts the Maximum value from the Skip DDA Value.

Element 464 Emits a Skip to the SourceOrder, increments the Index, and decrements the Count.

Figure 18:
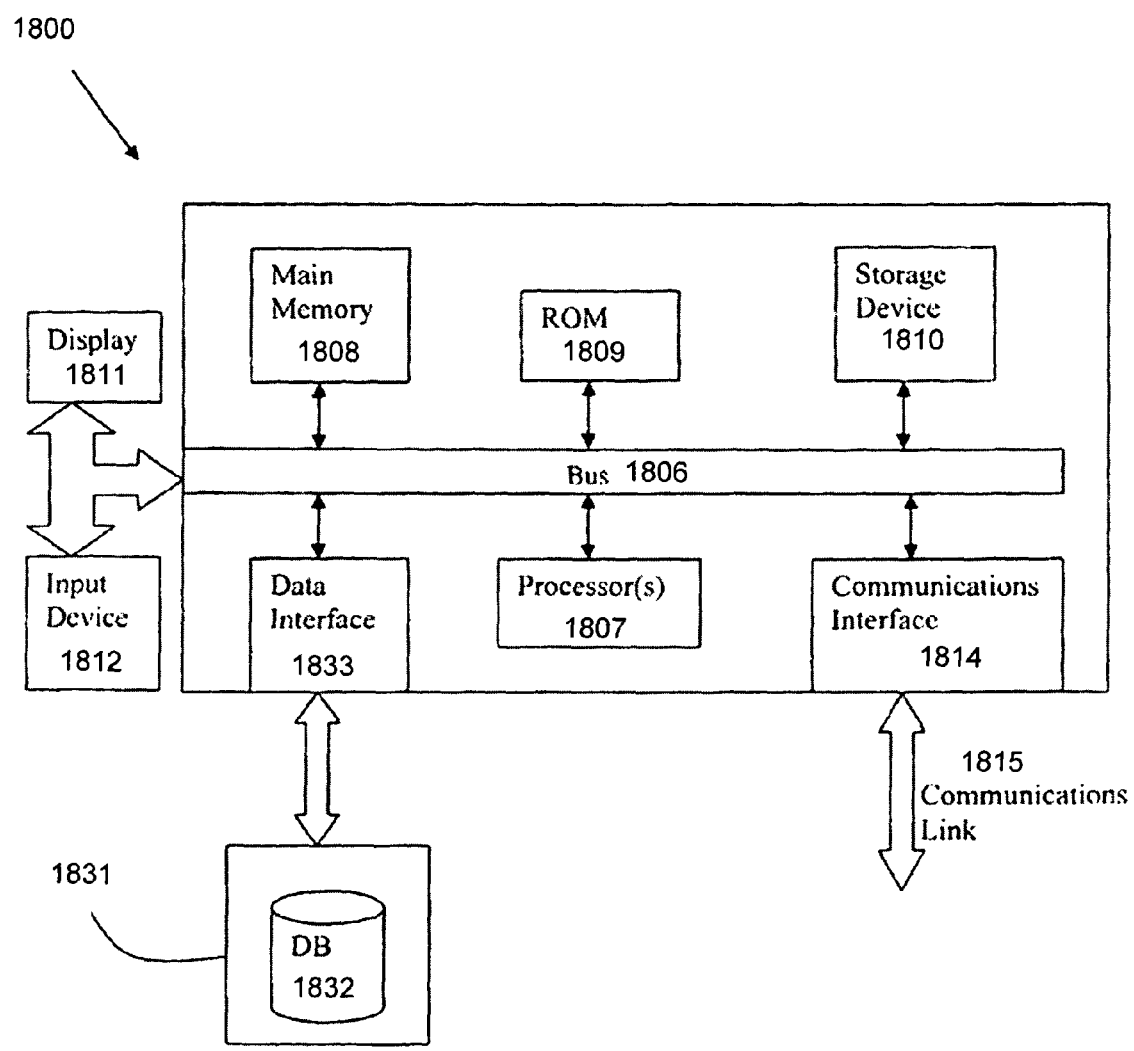
FIG. 18 depicts a computer system on which the system and method of the preceding figures can be implemented.

A computer system 1800 according to an embodiment will now be described with reference to FIG. 18, which is a block diagram of the functional components of a computer system 1800. As used herein, the term computer system 1800 is broadly used to describe any computing device that can store and independently run one or more programs.

Each computer system 1800 can include a communication interface 1814 coupled to the bus 1806. The communication interface 1814 provides two-way communication between computer systems 1800. The communication interface 1814 of a respective computer system 1800 transmits and receives electrical, electromagnetic or optical signals that include data streams representing various types of signal information, e.g., instructions, messages and data. A communication link 1815 links one computer system 1800 with another computer system 1800. For example, the communication link 1815 can be a LAN, in which case the communication interface 1814 can be a LAN card, or the communication link 1815 can be a PSTN, in which case the communication interface 1814 can be an integrated services digital network (ISDN) card or a modem, or the communication link 1815 can be the Internet, in which case the communication interface 1814 can be a dial-up, cable or wireless modem.

A computer system 1800 can transmit and receive messages, data, and instructions, including program, i.e., application, code, through its respective communication link 1815 and communication interface 1814. Received program code can be executed by the respective processor(s) 1807 as it is received, and/or stored in the storage device 1810, or other associated non-volatile media, for later execution.

In an embodiment, the computer system 1800 operates in conjunction with a data storage system 1831, e.g., a data storage system 1831 that contains a database 1832 that is readily accessible by the computer system 1800. The computer system 1800 communicates with the data storage system 1831 through a data interface 1833. A data interface 1833, which is coupled to the bus 1806, transmits and receives electrical, electromagnetic or optical signals that include data streams representing various types of signal information, e.g., instructions, messages and data. In embodiments, the functions of the data interface 1833 can be performed by the communication interface 1814.

Computer system 1800 includes a bus 1806 or other communication mechanism for communicating instructions, messages and data, collectively, information, and one or more processors 1807 coupled with the bus 1806 for processing information. Computer system 1800 also includes a main memory 1808, such as a random access memory (RAM) or other dynamic storage device, coupled to the bus 1806 for storing dynamic data and instructions to be executed by the processor(s) 1807. The main memory 1808 also can be used for storing temporary data, i.e., variables, or other intermediate information during execution of instructions by the processor(s) 1807.

The computer system 1800 can further include a read only memory (ROM) 1809 or other static storage device coupled to the bus 1806 for storing static data and instructions for the processor(s) 1807. A storage device 1810, such as a magnetic disk or optical disk, can also be provided and coupled to the bus 1806 for storing data and instructions for the processor(s) 1807.

A computer system 1800 can be coupled via the bus 1806 to a display device 1811, such as, but not limited to, a cathode ray tube (CRT), for displaying information to a user. An input device 1812, e.g., alphanumeric and other keys, is coupled to the bus 1806 for communicating information and command selections to the processor(s) 1807.

According to one embodiment, an individual computer system 1800 performs specific operations by its respective processor(s) 1807 executing one or more sequences of one or more instructions contained in the main memory 1808. Such instructions can be read into the main memory 1808 from another computer-usable medium, such as the ROM 1809 or the storage device 1810. Execution of the sequences of instructions contained in the main memory 1808 causes the processor(s) 1807 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1807. Such a medium can take many forms, including, but not limited to, non-volatile, volatile and transmission media. Non-volatile media, i.e., media that can retain information in the absence of power, includes the ROM 1809, CD ROM, magnetic tape, and magnetic discs. Volatile media, i.e., media that can not retain information in the absence of power, includes the main memory 1808. Transmission media includes coaxial cables, copper wire and fiber optics, including the wires that comprise the bus 1806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method of achieving frame rates for signals, comprising the steps of:
   providing a specified quantity of one or more input source streams, each input source stream comprising first framed data, and each input source stream having an associated nominal frame rate;
   wherein each input source stream is an AVStream-Process-Dispatch-method-initiated input source stream;
   specifying one or more logical streams, each logical stream comprising second framed data, and each logical stream having an associated specified frame rate;
   determining a source sequence list;
   selecting input source streams in a sequence, wherein the sequence is responsive to the source sequence list;
   processing the input source streams responsive to the sequence;
   supplying second framed data to the logical streams responsive to the processed input source streams;
   wherein a first case of operation corresponds to the specified quantity of input source streams is equal to a quantity of one;
   wherein a set of first additional cases of operation each correspond to the specified quantity of input source streams is equal to a quantity greater than one;
   calculating and instantiating an applicable case of operation,
   wherein the applicable case of operation is selected to be the first case of operation or selected to be from the set of first additional cases of operation; and,
   wherein at least two of any of the nominal frame rates and the specified frame rates are distinguishably different frame rates.

2. The method of claim 1, further comprising the steps of:
   determining an efficiency of a system receiving the one or more input source streams;
   calculating and instantiating one or more demands for a shared resources,
   wherein each demand
   is associated with one of the one or more logical streams,
   is responsive to at least the specified frame rate associated with the associated logical stream,
   is associated with one of the one or more input source streams,
   is responsive to at least the nominal frame rate associated with the associated input source stream, and,
   is responsive to at least the efficiency,
   calculating and instantiating a source sequence length,
   wherein calculation of the source sequence length is responsive to at least the efficiency, and,
   wherein calculation of the source sequence length is responsive to at least the one or more demands for the shared resources;
   calculating and instantiating a source sequence list,
   wherein calculation of the source sequence list is responsive to at least the efficiency,
   wherein calculation of the source sequence list is responsive to at least the one or more demands for the shared resources,
   wherein the source sequence list has a length, and,
   wherein the length of the source sequence list is responsive to at least the source sequence length;
   selecting input source streams in a sequence, wherein the sequence is responsive to at least the source sequence list;
   wherein the shared resources processes the selected input source streams in an order responsive to at least the sequence;
   for each of the one or more demands for the shared resources, supplying the logical stream associated with the demand with a processed input source stream,
   wherein the processed input source stream corresponds to a selected input source stream, and,
   wherein the selected input source stream is the input source stream associated with the demand;
   calculating and instantiating an aggregate demand for the shared resources, wherein the aggregate demand is responsive to at least the one or more demands for the shared resources;
   providing a specified availability of the shared resources;
   wherein the specified quantity of input source streams is equal to a quantity greater than one;
   wherein the applicable case of operation is further selected from the set of first additional cases of operation consisting of a second case of operation and a third case of operation;
   wherein the second case of operation corresponds to the aggregate demand for the shared resources less than or equal to the specified availability of the shared resources; and,
   wherein the third case of operation corresponds to the aggregate demand for the shared resources greater than the specified availability of the shared resources.

3. The method of claim 2, further comprising the steps of:
   specifying a skip process;
   calculating and instantiating an additional demand for the shared resources associated with the skip process;
   wherein calculation of the source sequence length is further responsive to at least the additional demand for the shared resources;
   wherein calculation of the source sequence list is further responsive to at least the additional demand for the shared resources; and,
   wherein the applicable case of operation is the second case of operation.

4. The method of claim 3, further comprising the steps of:
   calculating and instantiating the efficiency; and,
   wherein calculation of the efficiency is at least responsive to the specified quantity of one or more input source streams.

5. The method of claim 4, further comprising the steps of:
   calculating and instantiating a short term timing loop measure;
   calculating and instantiating a long term timing loop measure;
   wherein calculation of the efficiency is further at least responsive to the short term timing loop measure; and,
   wherein calculation of the efficiency is further at least responsive to the long term timing loop measure.

6. The method of claim 2, further comprising the steps of:
   derating the one or more demands for the shared resources, responsive to at least the aggregate demand for the shared resources; and,
   wherein the applicable case of operation is the third case of operation.

7. The method of claim 6, further comprising the steps of:
   calculating and instantiating the efficiency; and,
   wherein calculation of the efficiency is at least responsive to the specified quantity of one or more input source streams.

8. The method of claim 7, further comprising the steps of:
calculating and instantiating a short term timing loop measure;
calculating and instantiating a long term timing loop measure;
wherein calculation of the efficiency is further at least responsive to the short term timing loop measure; and,
wherein calculation of the efficiency is further at least responsive to the long term timing loop measure.

9. A system for achieving frame rates for signals, comprising:
a specified quantity of one or more input source streams, each input source stream comprising first framed data, and each input source stream having an associated nominal frame rate;
wherein each input source stream is an AVStream-Process-Dispatch-method-initiated input source stream;
one or more logical streams, each logical stream comprising second framed data, and each logical stream having an associated specified frame rate;
a source sequence list;
a multiplexer adapted to receive said one or more input source streams, wherein the multiplexer selectively routes said one or more input source streams, responsive to the source sequence list;
a computer system;
wherein the computer system determines an efficiency of a system receiving the one or more input source streams;
wherein the computer system calculates and instantiates one or more demands for
a shared resources,
wherein each demand
is associated with one of the one or more logical streams,
is responsive to at least the specified frame rate associated with the associated logical stream,
is associated with one of the one or more input source streams,
is responsive to at least the nominal frame rate associated with the associated input source stream, and,
is responsive to at least the efficiency;
wherein the computer system calculates and instantiates a source sequence length,
wherein calculation of the source sequence length is responsive to at least the efficiency, and,
wherein calculation of the source sequence length is responsive to at least the one or more demands for the shared resources;
wherein the computer system calculates and instantiates the source sequence list,
wherein calculation of the source sequence list is responsive to at least the efficiency,
wherein calculation of the source sequence list is responsive to at least the one or more demands for the shared resources,
wherein the source sequence list has a length, and,
wherein the length of the source sequence list is responsive to at least the source sequence length;
wherein the computer system calculates and instantiates an aggregate demand for the shared resources, wherein the aggregate demand is responsive to at least the one or more demands for the shared resources;
wherein the computer system calculates and instantiates an applicable case of operation,
wherein the applicable case of operation is selected from the set of cases of operation consisting of a first case of operation, a second case of operation, and a third case of operation;
wherein the first case of operation corresponds to the specified quantity of input source streams is equal to a quantity of one;
wherein the second case of operation corresponds to the aggregate demand for the shared resources less than or equal to the specified availability of the shared resources; and,
wherein the third case of operation corresponds to the aggregate demand for the shared resources greater than the specified availability of the shared resources.

10. The system of claim 9
wherein the shared resources is adapted to receive one or more selectively routed input source streams from said multiplexer.

11. The system of claim 9 further comprising
a demultiplexer adapted to supply second framed data to said one or more logical streams.

12. The system of claim 9 further comprising
a phase accumulator corresponding to one of the one or more input source streams.

13. The system of claim 9 further comprising
a phase accumulator corresponding to a skip process.

14. The system of claim 9:
wherein the computer system calculates and instantiates an additional demand for the shared resources associated with a skip process;
wherein calculation of the source sequence length is further responsive to at least the additional demand for the shared resources;
wherein calculation of the source sequence list is further responsive to at least the additional demand for the shared resources;
wherein the applicable case of operation is the second case of operation.

15. The system of claim 9:
wherein the computer system derates the one or more demands for the shared resources, responsive to at least the aggregate demand for the shared resources; and,
wherein the applicable case of operation is the third case of operation.

16. The system of claim 15:
wherein the computer system calculates and instantiates the efficiency;
wherein calculation of the efficiency is at least responsive to the specified quantity of one or more input source streams;
wherein the computer system calculates and instantiates a short term timing loop measure;
wherein the computer system calculates and instantiates a long term timing loop measure;
wherein calculation of the efficiency is further at least responsive to the short term timing loop measure; and,
wherein calculation of the efficiency is further at least responsive to the long term timing loop measure.

17. A system for achieving frame rates for signals, comprising:
a multiplexer adapted to receive a specified quantity of one or more input source streams;
wherein each input source stream is an AVStream-Process-Dispatch-method-initiated input source stream; and,
a source sequence list;
wherein the multiplexer selectively routes said one or more input source streams, responsive to the source sequence list;
wherein the source sequence list is responsive to one or more specified frame rates;

wherein each of the one or more specified frame rates is associated respectively with one of one or more logical streams;
wherein each input source stream comprises first framed data;
wherein each input source stream has an associated nominal frame rate;
wherein each logical stream comprises second framed data; and,
a computer system;
wherein the computer system determines an efficiency of a system receiving the one or more input source streams;
wherein the computer system calculates and instantiates one or more demands for a shared resources,
wherein each demand
is associated with one of the one or more logical streams,
is responsive to at least the specified frame rate associated with the associated logical stream,
is associated with one of the one or more input source streams,
is responsive to at least the nominal frame rate associated with the associated input source stream, and,
is responsive to at least the efficiency;
wherein the computer system calculates and instantiates a source sequence length,
wherein calculation of the source sequence length is responsive to at least the efficiency, and,
wherein calculation of the source sequence length is responsive to at least the one or more demands for the shared resources;
wherein the computer system calculates and instantiates the source sequence list,
wherein calculation of the source sequence list is responsive to at least the efficiency,
wherein calculation of the source sequence list is responsive to at least the one or more demands for the shared resources,
wherein the source sequence list has a length, and,
wherein the length of the source sequence list is responsive to at least the source sequence length;
wherein the computer system calculates and instantiates an aggregate demand for the shared resources, wherein the aggregate demand is responsive to at least the one or more demands for the shared resources;
wherein the computer system calculates and instantiates an applicable case of operation,
wherein the applicable case of operation is selected from the set of cases of operation consisting of a first case of operation, a second case of operation, and a third case of operation;
wherein the first case of operation corresponds to the specified quantity of input source streams is equal to a quantity of one;
wherein the second case of operation corresponds to the aggregate demand for the shared resources less than or equal to the specified availability of the shared resources; and,
wherein the third case of operation corresponds to the aggregate demand for the shared resources greater than the specified availability of the shared resources.

18. The system of claim 17
wherein the shared resources is adapted to receive one or more selectively routed input source streams from said multiplexer.

19. The system of claim 17 further comprising
a demultiplexer adapted to supply second framed data to said one or more logical streams.

20. The system of claim 17 further comprising
a phase accumulator corresponding to one of the one or more input source streams.

21. The system of claim 17 further comprising
a phase accumulator corresponding to a skip process.

22. The system of claim 17:
wherein the computer system calculates and instantiates an additional demand for the shared resources associated with a skip process;
wherein calculation of the source sequence length is further responsive to at least the additional demand for the shared resources;
wherein calculation of the source sequence list is further responsive to at least the additional demand for the shared resources; and,
wherein the applicable case of operation is the second case of operation.

23. The system of claim 17:
wherein the computer system derates the one or more demands for the shared resources, responsive to at least the aggregate demand for the shared resources; and,
wherein the applicable case of operation is the third case of operation.

24. The system of claim 23:
wherein the computer system calculates and instantiates the efficiency;
wherein calculation of the efficiency is at least responsive to the specified quantity of one or more input source streams;
wherein the computer system calculates and instantiates a short term timing loop measure;
wherein the computer system calculates and instantiates a long term timing loop measure;
wherein calculation of the efficiency is further at least responsive to the short term timing loop measure; and,
wherein calculation of the efficiency is further at least responsive to the long term timing loop measure.

* * * * *